United States Patent
Kuroda

(10) Patent No.: US 7,932,710 B2
(45) Date of Patent: Apr. 26, 2011

(54) STEP-UP CIRCUIT AND STEP-UP CIRCUIT DEVICE

(75) Inventor: Keisuke Kuroda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/877,540

(22) Filed: Sep. 8, 2010

(65) Prior Publication Data
US 2011/0006747 A1 Jan. 13, 2011

Related U.S. Application Data

(63) Continuation of application No. PCT/JP2009/005813, filed on Nov. 2, 2009.

(30) Foreign Application Priority Data

Jun. 3, 2009 (JP) ................................. 2009-133920

(51) Int. Cl.
*G05F 1/40* (2006.01)
(52) U.S. Cl. ...................................................... 323/288
(58) Field of Classification Search .................. 323/265, 323/271, 284, 285, 288, 351
See application file for complete search history.

(56) References Cited

U.S. PATENT DOCUMENTS

| | | | | |
|---|---|---|---|---|
| 5,612,610 A | * | 3/1997 | Borghi et al. | 323/222 |
| 7,432,757 B2 | * | 10/2008 | Kimura | 327/537 |
| 2007/0257652 A1 | | 11/2007 | Yanagishima | |
| 2009/0179584 A1 | * | 7/2009 | Miyanaga | 315/291 |

FOREIGN PATENT DOCUMENTS

| | | |
|---|---|---|
| JP | 2007-300760 | 11/2007 |
| JP | 2008-054469 | 3/2008 |

* cited by examiner

*Primary Examiner* — Adolf Berhane
(74) *Attorney, Agent, or Firm* — McDermott Will & Emery LLP

(57) ABSTRACT

A step-up circuit comprises a rectifier element 11 provided on a current path from a terminal VCC applied with a voltage source voltage VCC to a terminal VP connected to one electrode of a capacitor C1 such that a direction from the terminal VCC toward the terminal VP is a forward direction, a rectifier element 12 provided on a portion of the current path which is between the rectifier element 11 and the terminal VP such that a direction from the rectifier element 11 toward the terminal VP is a forward direction, a terminal BC1 which is connected to one electrode of a capacitor C2 and is applied with an oscillating voltage, a terminal BC2 which is connected to a portion of the current path which is between the rectifier element 11 and the rectifier element 12 and is connected to the other electrode of the capacitor C2, and a switching element 14 provided on a portion of the current path which is between a connection point, where the terminal BC2 is connected to the current path, and the terminal VCC, and the switching element 14 is configured to be turned ON and OFF according to the voltage at the terminal VP with respect to the voltage at the terminal BC2.

14 Claims, 10 Drawing Sheets

STEP-UP CIRCUIT AND STEP-UP CIRCUIT DEVICE

RELATED APPLICATIONS

This is a continuation application under 35 U.S.C 111(a) of pending prior International application No. PCT/JP2009/005813, filed on Nov. 2, 2009.

The disclosure of Japanese Patent Application No. 2009-133920 filed on Jun. 3, 2009 including specification, drawings and claims is incorporated herein by reference in its entirety.

BACKGROUND ART

1. Field of the Invention

The present invention relates to a step-up circuit and a step-up circuit device.

2. Description of the Related Art

A step-up circuit is a circuit configured to convert (step up) a voltage of a voltage source which is applied to a power supply terminal into a step-up voltage higher than the voltage of the voltage source and output the step-up voltage, and is built into various electronic devices. A step-up method in a step-up circuit includes a fly-back method using transformers, a charge pump method using capacitors, etc. The charge pump method can achieve a smaller-size because of the absence of the transformers as compared to the fly-back method. In particular, the charge pump method is widely used in portable devices which are required to be smaller-sized and thinned.

FIG. 10 is a view showing a configuration of a conventional step-up circuit device using the charge pump step-up circuit (see Japanese Laid-Open Patent Application Publication No. 2007-300760, especially FIG. 2). As shown in FIG. 10, a step-up circuit device 2 includes a charge pump step-up circuit 6 configured to step up a voltage source voltage VCC in such a manner that, using diodes DA and DB as charge transfer switches, charge is stored in a capacitor CA and the charge is transferred from the capacitor CA to a capacitor CB repetitively, based on a clock signal.

The step-up circuit 6 is implemented as a semiconductor integrated circuit, and includes a terminal T1 (power supply terminal) to which the voltage source voltage VCC is applied, a terminal T2 (output terminal) through which a step-up voltage VG is output, terminals CP1 and CP2 (capacitor connecting terminals) for connecting the electrodes of the capacitor CA, etc. The capacitor CB is connected to the terminal T1 and the terminal T2.

The step-up circuit 6 includes a step-up section 9 comprising the diodes DA and DB and a level shift circuit 7. The diodes DA and DB are connected in series between the terminal T1 and the terminal T2. The anode of the diode DB is connected to the terminal CP2, while the cathode of the diode DB is connected to the terminal T2. The step-up section 9 and the capacitors CA and CB constitute a charge pump circuit. The level shift circuit 7 receives as an input a clock signal CLK (H level: V0 (V), L level: 0(V)), shifts a level of the clock signal CLK and outputs a clock signal CLK1 (H level: VREG (V), L level: 0(V)). The clock signal CLK1 is input to the terminal CP1.

The step-up circuit 6 performs a step-up operation in such a manner that, using the clock signal CLK1 (clock signal), the diodes DA and DB are complementarily turned ON and OFF, charge is stored in the capacitor CA and the charge stored in the capacitor CA is transferred to the capacitor CB, which occurs repetitively. As a result of the step-up operation, a voltage at the terminal T2 rises from 0(V) to "VCC−2×Vd+VREG(V)." That is, the step-up circuit 6 steps-up the voltage source voltage VCC applied to the terminal T1 to the step-up voltage VG of "VCC−2×Vd+VREG(V)" and outputs the step-up voltage VG through the terminal T2.

If the terminal CP2 is shorted to ground, a ground-fault current flows through a current path including the terminal T1, the diode DA, and the terminal CP2, which possibly causes the diode DA to be broken down. If the terminal T2 is shorted to ground, a ground-fault current flows through a current path including the terminal T1, the diode DA, the diode DB and the terminal T2, which possibly causes the diode DA and the diode DB to be broken down. To avoid this, the step-circuit 6 has a ground-shorting protective function, for preventing an excess ground-fault current from flowing through the diode DA or the diode DA and the diode DB, which would damage the diode DA or the diode DA and the diode DB.

A switch SW and a switch control circuit 8 performs the above ground-shorting protective function. The switch SW is provided between the terminal T1 and the anode of the diode DA and is placed in a conductive state (normal state) or in a non-conductive state (shorted-to-ground state) based on a switch control signal CTRL from the switch control circuit 8. The switch control circuit 8 receives as inputs the voltage source voltage VCC applied to the terminal T1, a diode voltage VD1 corresponding to the voltage at the terminal CP2, and the step-up voltage VG corresponding to the voltage at the terminal T2.

The switch control circuit 8 detects whether or not the step-up voltage VG is below a predetermined threshold voltage. When detecting that the step-up voltage VG is below the predetermined threshold voltage, the switch control circuit 8 detects that the terminal CP2 or the terminal T2 is shorted to ground. Then, the switch control circuit 8 outputs the switch control signal CTRL to switch the switch SW from the conductive state to the non-conductive state. As a result, the current path through which the above ground-fault current flows is disconnected, thereby preventing the ground-fault current from flowing through the diode DA and the diode DB.

As shown in FIG. 5 of the above publication, the switch control circuit 8 includes a detecting section 8A constituted by a resistance voltage divider circuit, a comparator, etc, and a timer latch circuit 8B constituted by a timer circuit, a latch circuit, etc. Thus, since circuits other than the above step-up section are required to perform the ground-shorting protective function, a problem will arise, in which a circuit scale of the step-up circuit increases and reduction of the size and cost of the step-up circuit device is not fulfilled. Furthermore, at least the resistance voltage divider circuit and the comparator consume a control current. This increases current consumption in the step-up circuit device.

SUMMARY OF THE INVENTION

To solve the above described problem, according to a first aspect of the present invention, a step-up circuit configured to be connected to a first capacitor and a second capacitor, comprises a power supply terminal which is applied with a voltage source voltage; a first capacitor connecting terminal which is configured to be connected to one electrode of the first capacitor and through which a step-up voltage generated by stepping up the voltage source voltage is output; a first rectifier element which is provided on a current path from the power supply terminal to the first capacitor connecting terminal such that a direction from the power supply terminal toward the first capacitor connecting terminal is a forward direction; a second rectifier element which is provided on a portion of the current path which is between the first rectifier element and the first capacitor connecting terminal such that a direction from the first rectifier element toward the first capacitor connecting terminal is a forward direction; a second capacitor connecting terminal which is configured to be connected to one electrode of the second capacitor and is applied with an oscillating voltage; a third capacitor connecting terminal which is connected to a portion of the current path which is between the first rectifier element and the second rectifier element and configured to be connected to the other electrode of the second capacitor; and a switching element provided on a portion of the current path which is between a connection point, where the third capacitor connecting terminal is connected to the current path, and the power supply terminal, wherein a control terminal for controlling ON and OFF of the switching element is connected to the first capacitor connecting terminal, the switching element is turned ON when a voltage at the first capacitor connecting terminal is higher than a voltage at the third capacitor connecting terminal by a specified voltage or larger, and the switching element is turned OFF when the voltage at the first capacitor connecting terminal is not higher than the voltage at the third capacitor connecting terminal by the specified voltage or larger. As defined herein, the "specified voltage" refers to a voltage determined according to a design of the step-up circuit.

In accordance with the above configuration, when the first capacitor connecting terminal is shorted to ground, the voltage at the first capacitor connecting terminal continues an initial voltage 0(V). As a result, the switching element cannot be turned ON because the voltage at the first capacitor connecting terminal does not exceed the voltage at the third capacitor connecting terminal. In addition, since the current path from the power supply terminal to the first capacitor connecting terminal is disconnected under the OFF-state of the switching element, the first rectifier element and the second rectifier element cannot be turned ON. In this way, the first rectifier element and the second rectifier element are protected.

When the third capacitor connecting terminal is shorted to ground before the step-up operation, the initial voltage 0(V) at the third capacitor connecting terminal is applied to the high-potential electrode of the second rectifier element, and therefore the second rectifier element cannot be turned ON. In this state, charge is not transferred from the second capacitor to the first capacitor via the second rectifier element, and the voltage at the first capacitor connecting terminal cannot be stepped up and continues the initial voltage 0(V). Since the voltage at the first capacitor connecting terminal does not exceed the voltage at the third capacitor connecting terminal, the switching element cannot be turned ON. In addition, since the current path from the power supply terminal to the first capacitor connecting terminal is disconnected under the OFF-state of the switching element, the first rectifier element and the second rectifier element cannot be turned ON. In this way, the first rectifier element and the second rectifier element are protected.

When the third capacitor connecting terminal is shorted to ground during a step-up operation, stored charge is present in the first capacitor, and therefore, the voltage at the first capacitor connecting terminal decreases with a lapse of time. The switching element is turned OFF according to the voltage at the first capacitor connecting terminal with respect to the voltage at the third capacitor connecting terminal. For this reason, the current path of a ground-fault current flowing from the power supply terminal to the third capacitor connecting terminal via the first rectifier element is disconnected. In this way, the first rectifier element is protected.

The switching element may be a voltage-drive transistor including two main terminals to and from which a current inflows and outflows and the control terminal for controlling ON and OFF. One of the main terminals may be connected to a portion of the current path which is located closer to the power supply terminal, and the other main terminal may be connected to a portion of the current path which is located closer to the connection point of the third capacitor connecting terminal. The control terminal may be connected to the first capacitor connecting terminal.

When a current-drive transistor is used as the switching element, a current flows from the control terminal to the other main terminal, and therefore degradation of a step-up characteristic (step-up voltage) during a normal operation progresses. In contrast, when a voltage-drive transistor is used as the switching element, the control terminal is insulated and a current does not flow from the control terminal to the other main terminal. This makes it possible to suppress degradation of the step-up characteristic (step-up voltage) during the normal operation.

The switching element may be a N-channel MOS field effect transistor. The one main terminal may be a drain terminal. The other main terminal may be a source terminal. The control terminal may be a gate terminal. In this case, preferably, the switching element is an enhancement type switching element.

In accordance with such a configuration, high-speed switching of the switching element can be achieved, and a circuit configuration of the step-up circuit can be simplified.

The switching element may be an insulated gate bipolar transistor. The one main terminal may be a collector terminal. The other main terminal may be an emitter terminal. The control terminal may be a gate terminal.

In accordance with such a configuration, high-speed switching of the switching element and suppressing of electric power consumption can be achieved in a well-balanced manner, and a circuit configuration of the step-up circuit can be simplified.

The step-up circuit may further comprise a voltage clamping circuit connected in parallel with the second rectifier element, and the voltage clamping circuit may clamp the voltage at the first capacitor connecting terminal so that a voltage difference of the voltage at the first capacitor connecting terminal with respect to the voltage at the third capacitor connecting terminal does not exceed a predetermined voltage.

In accordance with such a configuration, when the third capacitor connecting terminal is shorted to ground during the step-up operation, the voltage clamping circuit can clamp the voltage at the first capacitor connecting terminal to the predetermined voltage. This makes it possible to suppress a ground-fault current flowing temporarily from the power supply terminal toward the third capacitor connecting terminal.

The second rectifier element may be a diode. The voltage clamping circuit may be a zener diode. An anode of the zener diode used as the voltage clamping circuit may be connected to an anode of the diode used as the second rectifier element. A cathode of the zener diode used as the voltage clamping circuit may be connected to a cathode of the diode used as the second rectifier element.

In accordance with such a configuration, a configuration of the voltage clamping circuit can be simplified.

The second rectifier element may be a diode. The voltage clamping circuit may be a diode. An anode of the diode used as the voltage clamping circuit may be connected to a cathode of the diode used as the second rectifier element. A cathode of the diode used as the voltage clamping circuit may be connected to an anode of the diode used as the second rectifier element.

In accordance with such a configuration, a configuration of the voltage clamping circuit can be simplified.

The step-up circuit may further comprise a resistor element provided on a current path between the power supply terminal and the third capacitor connecting terminal to restrict a current.

In accordance with such a configuration, when the third capacitor connecting terminal is shorted to ground during the step-up operation, the resistor element can restrict the ground-fault current flowing temporarily from the power supply terminal toward the third capacitor connecting terminal.

To solve the above described problem, according to another aspect of the present invention, a step-up circuit configured to be connected to a first capacitor and a second capacitor, comprises: a power supply terminal which is applied with a voltage source voltage; a first capacitor connecting terminal which is configured to be connected to one electrode of the first capacitor and through which a step-up voltage generated by stepping up the voltage source voltage is output; a diode which is provided on a current path from the power supply terminal to the first capacitor connecting terminal such that a direction from the power supply terminal toward the first capacitor connecting terminal is a forward direction; a zener diode which is provided on a portion of the current path which is between the diode and the first capacitor connecting terminal such that a direction from the diode toward the first capacitor connecting terminal is a forward direction; a second capacitor connecting terminal which is configured to be connected to one electrode of the second capacitor and is applied with an oscillating voltage; a third capacitor connecting terminal which is connected to a portion of the current path which is between the diode and the zener diode and configured to be connected to the other electrode of the second capacitor; and a switching element provided on a portion of the current path which is between a connection point, where the third capacitor connecting terminal is connected to the current path, and the power supply terminal, wherein a control terminal for controlling ON and OFF of the switching element is connected to the first capacitor connecting terminal, the switching element is turned ON when a voltage at the first capacitor connecting terminal is higher than a voltage at the third capacitor connecting terminal by a specified voltage or larger, and the switching element is turned OFF when the voltage at the first capacitor connecting terminal is not higher than the voltage at the third capacitor connecting terminal by the specified voltage or larger; and the zener diode clamps the voltage at the first capacitor connecting terminal to a predetermined voltage when the voltage at the first capacitor connecting terminal is higher than the voltage at the third capacitor connecting terminal by the predetermined voltage.

In accordance with the above configuration, when the first capacitor connecting terminal is shorted to ground, the voltage at the first capacitor connecting terminal continues an initial voltage 0(V). As a result, the switching element cannot be turned ON and therefore, the diode and the zener diode cannot be turned ON. In this way, the diode and the zener diode are protected.

When the third capacitor connecting terminal is shorted to ground before the step-up operation, the initial voltage 0(V) at the third capacitor connecting terminal is applied to the high-potential electrode of the zener diode in the forward direction, and therefore the zener diode cannot be turned ON.

In this state, charge is not transferred from the second capacitor to the first capacitor via the zener diode, and the voltage at the first capacitor connecting terminal cannot be stepped up and continues the initial voltage 0(V). Therefore, the switching element cannot be turned ON and the diode and the zener diode cannot be turned ON, either. In this way, the diode and the zener diode are protected.

When the third capacitor connecting terminal is shorted to ground during the step-up operation, the zener diode can clamp the voltage at the first capacitor connecting terminal to the predetermined voltage. This makes it possible to suppress a ground-fault current flowing temporarily from the power supply terminal toward the third capacitor connecting terminal.

To solve the above described problem, according to another aspect of the present invention, a step-up circuit device comprises a first capacitor; a second capacitor; a step-up circuit configured to output a step-up voltage generated by stepping up the voltage source voltage based on a clock signal; a load control circuit configured to control a load based on the step-up voltage; and a timer circuit configured to place the load control circuit in a stand-by mode during a time period from when the clock signal starts oscillation until the timer circuit finishes counting a predetermined time; wherein the step-up circuit includes: a power supply terminal which is applied with a voltage source voltage; a first capacitor connecting terminal which is connected to one electrode of the first capacitor and through which the step-up voltage generated by stepping up the voltage source voltage is output; a first rectifier element which is provided on a current path from the power supply terminal to the first capacitor connecting terminal such that a direction from the power supply terminal toward the first capacitor connecting terminal is a forward direction; a second rectifier element which is provided on a portion of the current path which is between the first rectifier element and the first capacitor connecting terminal such that a direction from the first rectifier element toward the first capacitor connecting terminal is a forward direction; a second capacitor connecting terminal which is connected to one electrode of the second capacitor and is applied with an oscillating voltage; a third capacitor connecting terminal which is connected to a portion of the current path which is between the first rectifier element and the second rectifier element and to the other electrode of the second capacitor; and a switching element provided on a portion of the current path which is between a connection point, where the third capacitor connecting terminal is connected to the current path, and the power supply terminal, wherein a control terminal for controlling ON and OFF of the switching element is connected to the first capacitor connecting terminal, the switching element is turned ON when a voltage at the first capacitor connecting terminal is higher than a voltage at the third capacitor connecting terminal by a specified voltage or larger, and the switching element is turned OFF when the voltage at the first capacitor connecting terminal is not higher than the voltage at the third capacitor connecting terminal by the specified voltage or larger.

In accordance with such a configuration, the first rectifier element or the first rectifier element and the second rectifier element in the step-up circuit are effectively protected as described above. In addition, when the step-up voltage output through the first capacitor connecting terminal is rising and still significantly low, the load control circuit is placed in the stand-by mode during the predetermined time counted by the timer circuit. Therefore, an incorrect operation of the load control circuit and an increase in heat generated in the load control circuit are prevented when the step-up operation starts.

To solve the above described problem, according to another aspect of the present invention, a step-up circuit device comprises a first capacitor; a second capacitor; a step-up circuit configured to output a step-up voltage generated by stepping up a voltage source voltage based on a clock signal; a load control circuit configured to control a load based on the step-up voltage; and a timer circuit configured to place the load control circuit in a stand-by mode during a time period from when the clock signal starts oscillation until the timer circuit finishes counting a predetermined time; wherein the step-up circuit includes: a power supply terminal which is applied with the voltage source voltage; a first capacitor connecting terminal which is connected to one electrode of the first capacitor and through which the step-up voltage generated by stepping up the voltage source voltage is output; a diode which is provided on a current path from the power supply terminal to the first capacitor connecting terminal such that a direction from the power supply terminal toward the first capacitor connecting terminal is a forward direction; a zener diode which is provided on a portion of the current path which is between the diode and the first capacitor connecting terminal such that a direction from the diode toward the first capacitor connecting terminal is a forward direction; a second capacitor connecting terminal which is connected to one electrode of the second capacitor and is applied with an oscillating voltage; a third capacitor connecting terminal which is connected to a portion of the current path which is between the diode and the zener diode and to the other electrode of the second capacitor; and a switching element provided on a portion of the current path which is between a connection point, where the third capacitor connecting terminal is connected to the current path, and the power supply terminal, wherein a control terminal for controlling ON and OFF of the switching element is connected to the first capacitor connecting terminal, the switching element is turned ON when a voltage at the first capacitor connecting terminal is higher than a voltage at the third capacitor connecting terminal by a specified voltage or larger, and the switching element is turned OFF when the voltage at the first capacitor connecting terminal is not higher than the voltage at the third capacitor connecting terminal by the specified voltage or larger; and the zener diode clamps the voltage at the first capacitor connecting terminal to a predetermined voltage when the voltage at the first capacitor connecting terminal is higher than the voltage at the third capacitor connecting terminal by the predetermined voltage.

In accordance with such a configuration, the first rectifier element or the first rectifier element and the second rectifier element in the step-up circuit are effectively protected as described above. In addition, when the step-up voltage output through the first capacitor connecting terminal is rising and still significantly low, the load control circuit is placed in the stand-by mode during the predetermined time counted by the timer circuit. Therefore, an incorrect operation of the load control circuit and an increase in heat generated in the load control circuit are prevented when the step-up operation starts.

To solve the above described problem, according to another aspect of the present invention, a step-up circuit device comprises a first capacitor; a second capacitor; a step-up circuit configured to output a step-up voltage generated by stepping up a voltage source voltage based on an oscillating voltage; a load control circuit configured to control a load based on the step-up voltage; and a comparator circuit configured to compare the step-up voltage to a predetermined reference voltage and place the load control circuit in a stand-by mode during a time period before the step-up voltage exceeds the predetermined reference voltage; wherein the step-up circuit includes: a power supply terminal which is applied with the voltage source voltage; a first capacitor connecting terminal which is connected to one electrode of the first capacitor and through which the step-up voltage generated by stepping up the voltage source voltage is output; a first rectifier element which is provided on a current path from the power supply terminal to the first capacitor connecting terminal such that a direction from the power supply terminal toward the first capacitor connecting terminal is a forward direction; a second rectifier element which is provided on a portion of the current path which is between the first rectifier element and the first capacitor connecting terminal such that a direction from the first rectifier element toward the first capacitor connecting terminal is a forward direction; a second capacitor connecting terminal which is connected to one electrode of the second capacitor and is applied with the oscillating voltage; a third capacitor connecting terminal which is connected to a portion of the current path which is between the first rectifier element and the second rectifier element and to the other electrode of the second capacitor; and a switching element provided on a portion of the current path which is between a connection point, where the third capacitor connecting terminal is connected to the current path, and the power supply terminal, wherein a control terminal for controlling ON and OFF of the switching element is connected to the first capacitor connecting terminal, the switching element is turned ON when a voltage at the first capacitor connecting terminal is higher than a voltage at the third capacitor connecting terminal by a specified voltage or larger, and the switching element is turned OFF when the voltage at the first capacitor connecting terminal is not higher than the voltage at the third capacitor connecting terminal by the specified voltage or larger.

In accordance with such a configuration, the first rectifier element or the first rectifier element and the second rectifier element in the step-up circuit are effectively protected as described above. In addition, when the step-up voltage output through the first capacitor connecting terminal is rising and still significantly low, the load control circuit is placed in the stand-by mode during the time period before the step-up voltage exceeds the predetermined reference voltage in the comparator circuit. Therefore, an incorrect operation of the load control circuit and an increase in heat generated in the load control circuit are prevented when the step-up operation starts.

To solve the above described problem, according to another aspect of the present invention, a step-up circuit device comprise a first capacitor; a second capacitor; a step-up circuit configured to output a step-up voltage generated by stepping up a voltage source voltage based on an oscillating voltage; a load control circuit configured to control a load based on the step-up voltage; and a comparator circuit configured to compare the step-up voltage to a predetermined reference voltage and place the load control circuit in a stand-by mode during a time period before the step-up voltage exceeds the predetermined reference voltage; wherein the step-up circuit includes: a power supply terminal which is applied with a voltage source voltage; a first capacitor connecting terminal which is connected to one electrode of the first capacitor and through which the step-up voltage generated by stepping up the voltage source voltage is output; a diode which is provided on a current path from the power supply terminal to the first capacitor connecting terminal such that a direction from the power supply terminal toward the first capacitor connecting terminal is a forward direction; a zener diode which is provided on a portion of the current path which is between the diode and the first capacitor connecting terminal such that a direction from the diode toward the first capacitor connecting terminal is a forward direction; a second capacitor connecting terminal which is connected to one electrode of the second capacitor and is applied with the oscillating voltage; a third capacitor connecting terminal which is connected to a portion of the current path which is between the diode and the zener diode and to the other electrode of the second capacitor; and a switching element provided on a portion of the current path which is between a connection point, where the third capacitor connecting terminal is connected to the current path, and the power supply terminal, wherein a control terminal for controlling ON and OFF of the switching element is connected to the first capacitor connecting terminal, the switching element is turned ON when a voltage at the first capacitor connecting terminal is higher than a voltage at the third capacitor connecting terminal by a specified voltage or larger, and the switching element is turned OFF when the voltage at the first capacitor connecting terminal is not higher than the voltage at the third capacitor connecting terminal by the specified voltage or larger; and the zener diode clamps the voltage at the first capacitor connecting terminal to a predetermined voltage when the voltage at the first capacitor connecting terminal is higher than the voltage at the third capacitor connecting terminal by the predetermined voltage.

In accordance with such a configuration, the first rectifier element or the first rectifier element and the second rectifier element in the step-up circuit are effectively protected as described above. In addition, when the step-up voltage output through the first capacitor connecting terminal is rising and still significantly low, the load control circuit is placed in the stand-by mode during the time period before the step-up voltage exceeds the predetermined reference voltage in the comparator circuit. Therefore, an incorrect operation of the load control circuit and an increase in heat generated in the load control circuit are prevented when the step-up operation starts.

The above and further objects, features and advantages of the disclosure will more fully be apparent from the following detailed description with reference to the accompanying drawings.

DETAILED DESCRIPTION OF PREFERRED EMBODIMENTS

Hereinafter, preferred embodiments of the present invention will be described with reference to the drawings.

Embodiment 1

[Configuration of Step-Up Circuit Device]

Figure 1:
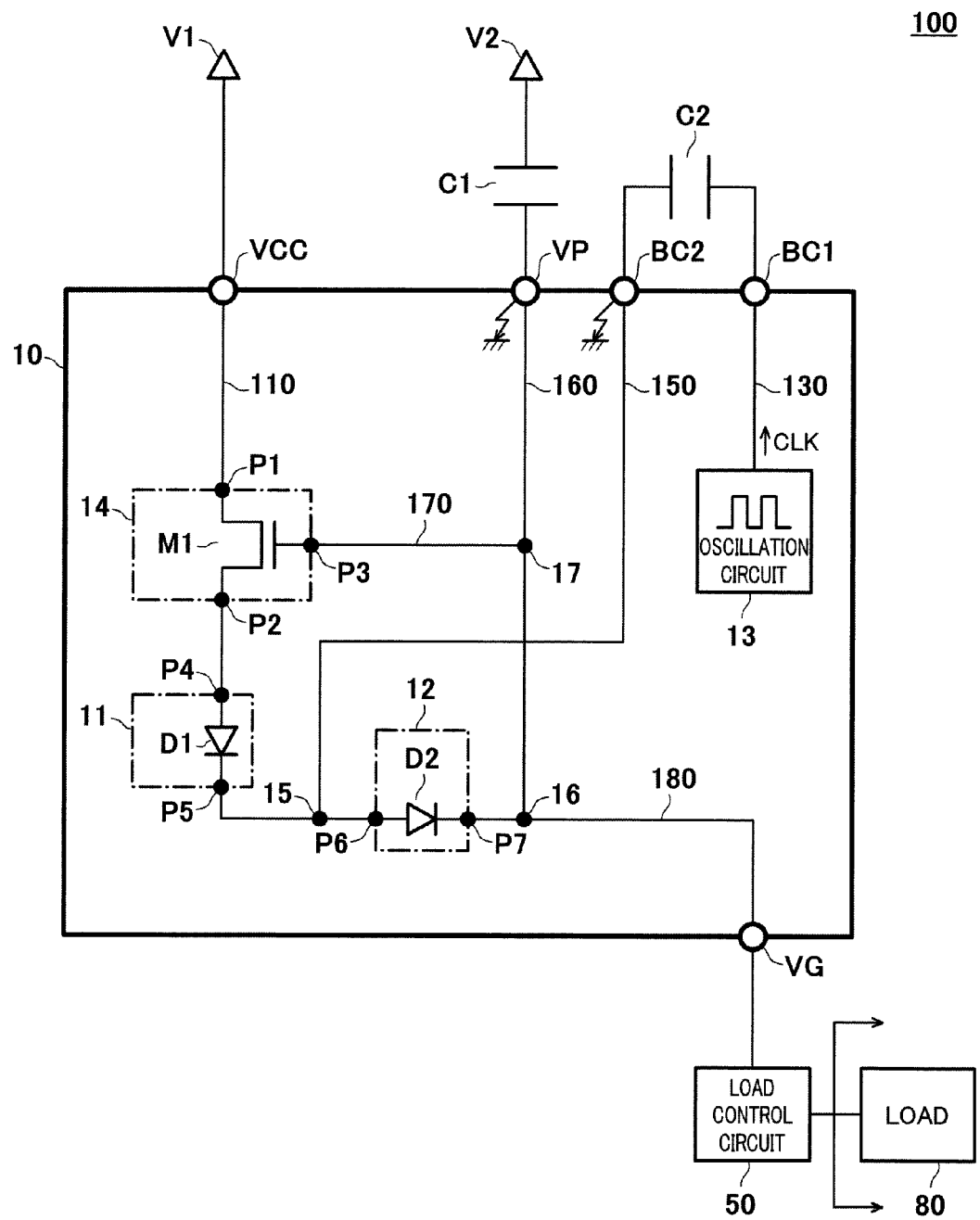
FIG. 1 is a view showing a configuration of a step-up circuit device including a step-up circuit according to Embodiment 1 of the present invention.

FIG. 1 is a view showing a configuration of a step-up circuit device including a step-up circuit according to Embodiment 1 of the present invention.

As shown in FIG. 1, a step-up circuit device 100 is configured to include a voltage source V1, a voltage source V2, a capacitor C1 (first capacitor), a capacitor C2 (second capacitor), a step-up circuit 10, and a load control circuit 50.

The step-up circuit 10 employs a charge pump method in which storage of charge in the capacitor C2 and transfer of the charge from the capacitor C2 to the capacitor C1 are performed repetitively based on a clock signal (oscillating voltage), by using a rectifier element 11 and a rectifier element 12 (charge transfer switches), thereby stepping up the voltage source voltage VCC of the voltage source V1.

The step-up circuit device 100 causes the step-up circuit 10 to step up the voltage source voltage VCC using the clock signal CLK as described above, and causes the load control circuit 50 to drive a load 80 based on the stepped-up voltage at the terminal VG (step-up voltage). The step-up circuit device 100 may be configured to omit the voltage source V2 by using the voltage source V1 as a common voltage source and connect the other electrode of the capacitor C1 to the voltage source V1 like the step-up circuit device 2 of FIG. 10.

Hereinafter, the configuration of the step-up circuit 10 will be described in detail.

The step-up circuit 10 is implemented (formed) as a semi-conductor integrated circuit such as analog IC. The step-up circuit 10 includes a terminal VCC (power supply terminal) which is connected to the voltage source V1 and is applied with the voltage VCC (voltage source voltage) at the voltage source V1, a terminal BC1 (second capacitor connecting terminal) which is connected to one electrode of the capacitor C2 and to which the clock signal CLK is input, a terminal BC2 (third capacitor connecting terminal) connected to the other electrode of the capacitor CP2, a terminal VP (first capacitor connecting terminal) which is connected to one electrode of the capacitor C1 and outputs the step-up voltage VG which is generated by stepping up the voltage source voltage VCC, and a terminal VG through which the step-up voltage VG is output. The terminal VG may also be used as the terminal VP like the step-up circuit device 2 of FIG. 10. In this case, the load control circuit 50 is connected to the terminal VP.

The step-up circuit 10 further includes a rectifier element 11 (first rectifier element), a rectifier element 12 (second rectifier element), an oscillation circuit 13 and a switching element 14. Hereinafter, a pair of electrodes of the rectifier element 11 and the rectifier element 12 which are electrodes at high potential in a case where a forward current flows through the rectifier element 11 and the rectifier element 12 are referred to as "high-potential electrodes," while a pair of electrodes of the rectifier element 11 and the rectifier element 12 which are electrodes at low potential in a case where a forward current flows through the rectifier element 11 and the rectifier element 12 are referred to as "low-potential electrodes."

The rectifier element 11 is an element having a characteristic in which the rectifier element 11 flows a forward current when a forward bias voltage exceeding a predetermined threshold voltage Vd is applied thereto. The rectifier element 11 is disposed on a current path between the terminal VCC and the terminal BC2 (wire 110, node 15 disposed in a portion of the wire 110 between the rectifier elements 11 and 12, wire 150) such that a high-potential electrode P4 is located closer to the terminal VCC and a low-potential electrode P5 is located closer to the terminal BC2. In other words, the rectifier element 11 is disposed in forward direction in a direction from the terminal VCC toward the terminal BC2. In this embodiment, as the rectifier element 11, a diode D1 which is a diode rectifying switching element is used. In this case, the threshold voltage Vd is a forward drop voltage of the diode D1. Alternatively, as the rectifier element 11, a synchronization rectifying switching element may be used, for example.

The rectifier element 12 is an element having a characteristic in which the rectifier element 12 flows a forward current when a forward bias voltage exceeding the predetermined threshold voltage Vd is applied thereto. The rectifier element 12 is disposed on a current path between the terminal BC2 and the terminal VP (wire 150, node 15, node 16, wire 160) such that a high-potential electrode P6 is located closer to the terminal BC2 in the forward direction and a low-potential electrode P7 is located closer to the terminal VP in the forward direction. The rectifier element 12 is connected in series with the rectifier element 11. In other words, the rectifier element 12 is disposed in the forward direction in a direction from the rectifier element 11 toward the terminal VP. In this embodiment, the rectifier element 12 is connected to the terminal VG via a wire 180. Like the rectifier element 11, as the rectifier element 12, a diode D2 which is a diode rectifying switching element is used. In this case, the threshold voltage Vd of the rectifier element 12 is a forward drop voltage at the diode D2. Alternatively, as the rectifier element 12, a synchronization rectifying switching element may be used, for example.

The switching element 14 is applied with the voltage at the terminal VP and is configured to be turned ON and OFF according to the voltage at the terminal VP and the voltage at the terminal BC2. To be specific, the switching element 14 is disposed on a current path (wire 110) between the terminal VCC and the high-potential electrode P4 of the rectifier element 11. Alternatively, the switching element 14 may be disposed on a current path (wire 110, node 15) between the low-potential electrode P5 of the rectifier element 11, and the terminal BC2 and the high-potential electrode P6 of the rectifier element 12 (wire 110, node 15). In other words, the arrangement of the switching element 14 and the rectifier element 11 shown in FIG. 1 may be reversed.

In this embodiment, as the switching element 14, a voltage-drive transistor including two main terminals P1 and P2 to and from which a current inflows and outflows and a control terminal P3 for controlling ON and OFF of the switching element 14. For example, if a current-drive transistor such as a bipolar transistor is used as the switching element 14, degradation of a step-up property (step-up voltage) progresses during a normal operation, because a current flows from the control terminal P3 to the main terminal P2. On the other hand, if the voltage-drive transistor is used as the switching element 14, degradation of a step-up property (step-up voltage) is suppressed during a normal operation, because the control terminal is insulated and therefore no current flows from the control terminal P3 to the main terminal P2.

The main terminal P1 of the two main terminals P1 and P2 of the switching element 14 is connected to a current path (wire 110) closer to the terminal VCC, while the main terminal P2 is connected to a current path closer (wire 110, node 15, wire 150) to the terminal BC2. The control terminal P3 of the switching element 14 is connected to a node 17 disposed on a current path (node 16 provided on the wire 180, wire 160) between the rectifier element 12 and the terminal VP, via a wire 170. Alternatively, a small resistor for preventing electrostatic discharge failure may be connected to the main terminals P1 and P2 and to the control terminal P3.

As the voltage-drive transistor which is the switching element 14, for example, a N-channel MOS field effect transistor may be used. In this case, the main terminal P1 is a drain terminal, the main terminal P2 is a source terminal, and the control terminal P3 is a gate terminal. In this case, a threshold voltage Vthm of the switching element 14 is a gate-to-source threshold voltage.

As the voltage-drive transistor which is the switching element 14, for example, an insulated gate bipolar transistor (IGBT) may be used. In this case, the main terminal P1 is a collector terminal, the main terminal P2 is an emitter terminal, and the control terminal P3 is a gate terminal. In this case, the threshold voltage Vthm of the switching element is a gate-to-emitter threshold voltage.

The oscillation circuit 13 starts an oscillation operation after a lapse of a predetermined time after the voltage source voltage VCC is applied to the terminal VCC, and concurrently generates the clock signal CLK (H level: VBC1 (V), L level: 0(V)). The clock signal CLK has a frequency of, for example, several hundreds kHz. The voltage (oscillating voltage) of the clock signal CLK is applied to the one electrode of the capacitor C2 via the terminal BC1. In this embodiment, the clock signal CLK of a square wave is used as the oscillating voltage applied to the terminal BC1, but the oscillating voltage is not limited to this. A voltage oscillating to have a minimum voltage value lower than the voltage source voltage VCC will suffice as the oscillating voltage. It should be noted that the voltage desirably oscillates at a high speed and more desirably has a square wave to suitably step up the voltage.

[Step-Up Operation of Step-Up Circuit at Start of Step-Up Operation]

Figure 2:
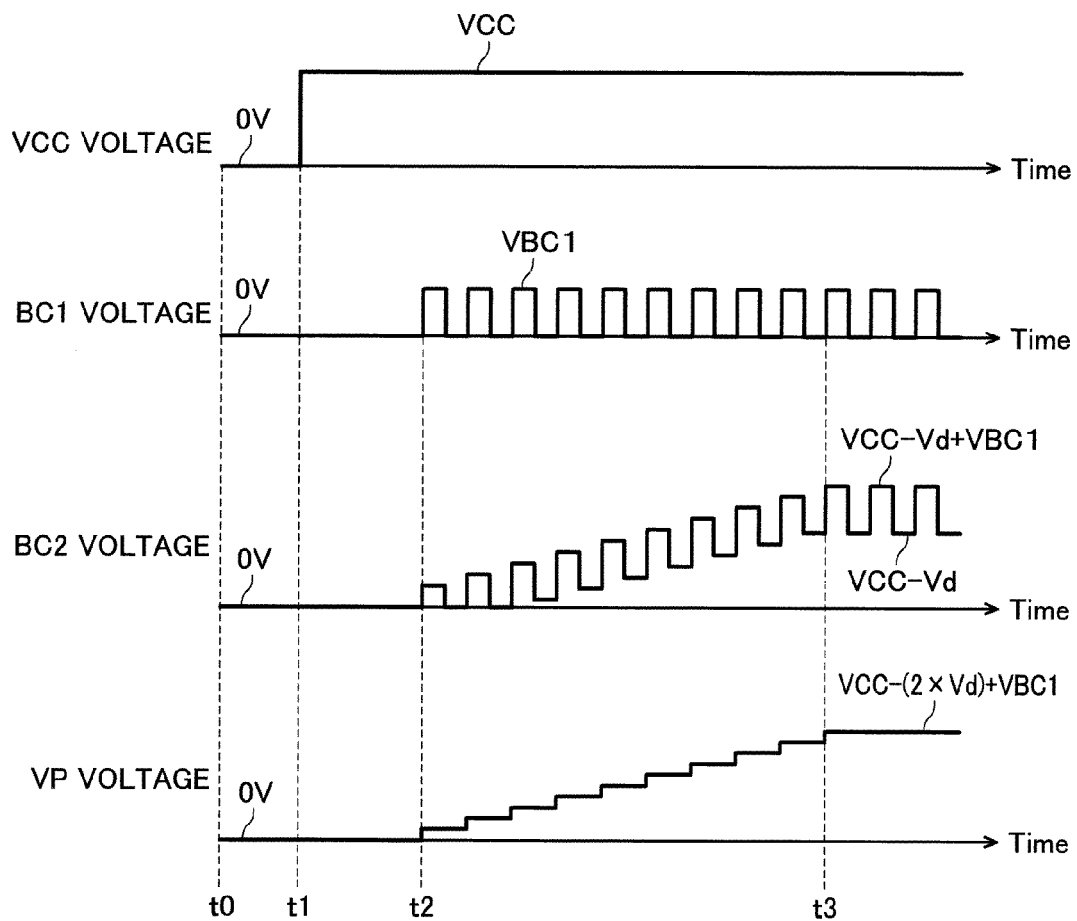
FIG. 2 is a timing chart showing a step-up operation of the step-up circuit according to Embodiment 1 of the present invention, at start of the step-up operation.

FIG. 2 is a timing chart showing a step-up operation of the step-up circuit 10 of FIG. 1, at start of the step-up operation.

At time t0 before the voltage source voltage VCC is applied to the terminal VCC, an initial voltage at the terminal VCC, an initial voltage at the terminal BC1, and an initial voltage at the terminal BC2 are all 0(V).

At time t1, the voltage source voltage VCC is applied to the terminal VCC, and the voltage at the terminal VCC rises from an initial voltage 0(V) to the voltage source voltage VCC (V). On the other hand, the voltage at the terminal VP is maintained at the initial voltage 0(V). For this reason, the initial voltage 0(V) is applied to the control terminal P3 of the switching element 14, through the node 17 of the wire 160 and the wire 170, and therefore, the switching element 14 cannot be turned ON. Therefore, a current path used for supplying a current from the terminal VCC to the terminal BC2 and to the terminal VP is disconnected, so that the voltage at the terminal BC2 and the voltage at the terminal VP are maintained at the initial voltage 0(V). The oscillation circuit 13 does not start the oscillation operation yet, and the voltage at the terminal BC1 is maintained at the initial voltage 0(V).

At time t2, the oscillation circuit 13 starts the oscillation operation and starts inputting the clock signal CLK to the terminal BC1. The voltage at the terminal BC1 has a waveform in which VBC1(V) and 0(V) are repeated alternately such that one of them occurs every ½ cycle of the clock signal CLK.

When the voltage at the terminal BC1 switches from 0(V) to VBC1 (V), the voltage at the terminal BC2 rises according to rising of the voltage at the terminal BC1. In association with this, a forward bias voltage exceeding the threshold voltage Vd is applied to the rectifier element 12, which is turned ON. Thereupon, the charge stored in the capacitor C2 is transferred to one electrode of the capacitor C1 via the terminal BC2, the wire 150, the rectifier element 12, the wire 160 and the terminal VP, according to a duration of application of VBC1 (V). The voltage at the terminal VP rises until the voltage rising at the terminal VP (one electrode of the capacitor C1) because of the transfer of charge and a voltage drop at the terminal BC2 come to equilibrium. In this way, the voltage at the terminal VP is raised in a stepwise manner every time the capacitor C1 stores the charge transferred from the capacitor C2.

When the voltage at the terminal BC1 switches from BC1 (V) to 0(V), the voltage at the terminal BC1 decreases according to a voltage drop at the terminal BC1. On the other hand, the voltage at the terminal VP exceeds a voltage (Vthm+Vd) which is a sum of the threshold voltage Vthm of the switching element 14 and the threshold voltage Vd of the rectifier element 11, according to the storage of charge in the capacitor C1. Therefore, the switching element 14 and the rectifier element 11 can be turned ON. Thereupon, the voltage source voltage VCC applied to the terminal VCC is applied to the capacitor C2 via the switching element 14, the rectifier element 11, the wire 150, and the terminal BC2. As a result, the charge is stored in the capacitor C2.

The above mentioned operation repeats upon the start of the oscillation operation of the oscillation circuit 13, thereby allowing the voltage at the terminal BC2 and the voltage at the terminal VP to rise.

After time t3, the voltage at the terminal VP rises to a desired step-up voltage VG. The step-up voltage VG reaches "VCC+VBC1−2×Vd(V)" which is obtained by subtracting a voltage drop of (2×Vd) of the threshold voltage Vd of the rectifier element 11 and the threshold voltage Vd of the rectifier element 12 from a sum of the voltage source voltage VCC applied to the terminal VCC and the voltage VBC1(V) at H level of the clock signal CLK applied to the terminal BC1. In this case, the voltage applied to the control terminal P3 of the switching element 14 is a stepped-up voltage which is higher than the voltage source voltage VCC, and thus, an ON-resistance of the switching element 14 is allowed to be sufficiently low. Therefore, the step-up circuit 10 can maintain a step-up characteristic which is substantially the same as that in a case where the switching element 14 is omitted.

After time t3, when the voltage at the terminal BC1 is 0(V), the voltage at the terminal BC2 is "VCC−Vd(V)" which is obtained by subtracting the voltage drop Vd of the threshold Vd of the rectifier element 11 from the voltage source voltage VCC applied to the terminal VCC, because the switching element 14 and the rectifier element 11 are turned ON and the rectifier element 12 is turned OFF. On the other hand, after time t3, when the voltage at the terminal BC1 is VBC1(V), the voltage at the terminal BC2 is "VCC+VBC1−Vd(V)" which is a sum of the voltage "VCC+VBC1−2×Vd(V)" at the terminal VP in a steady state and the threshold voltage Vd of the rectifier element 12, because the switching element 14 and the rectifier element 11 are turned OFF and the rectifier element 12 is turned ON. As described above, the switching element 14 is configured not to continue to be ON, according to the rising of the voltage at the terminal VP, but whether the switching element 14 is turned ON or OFF depends on a relationship between the voltage at the terminal VP which is applied to the control terminal P3 and the voltage at the terminal BC2 connected to the node 15 on the current path between the rectifier elements 11 and 12. To be specific, when the voltage at the terminal VP with respect to the voltage at the terminal BC2, is higher than "Vthm+Vd" which is a sum of the threshold voltage Vthm of the switching element 14 and the threshold voltage Vd of the rectifier element 11, the switching element 14 and the rectifier element 11 are turned ON. On the other hand, when the voltage at the terminal VP with respect to the voltage at the terminal BC2, is lower than "Vthm+Vd" which is a sum of the threshold voltage Vthm of the switching element 14 and the threshold voltage Vd of the rectifier element 11, the switching element 14 and the rectifier element 11 are turned OFF.

As described above, the step-up circuit 10 performs a step-up operation in such a manner that, using the clock signal CLK, the rectifier elements 11 and 12 which are charge transfer switches are complementarily turned ON and OFF and the charge stored in the capacitor C2 is transferred to the capacitor C1, which operation occurs repetitively. As a result of the step-up operation, the voltage at the terminal VP in a steady state and the voltage at the terminal VG in a steady state are "VCC+VBC1−2×Vd(V)."

[Protective Operation Performed when Terminal VP is Shorted to Ground]

The protective operation which is performed when the terminal VP in the step-up circuit 10 of Embodiment 1 is shorted to ground will now be described.

It is supposed that the voltage at the terminal VP has dropped to 0(V) when the terminal VP is shorted to ground. To flow a ground-fault current from the terminal VCC to the terminal VP via the switching element 14, the rectifier element 11 and the rectifier element 12, it is necessary to apply a voltage which is not less than "Vthm+2×Vd(V)" to the control terminal P3 of the switching element 14.

However, since the voltage (0(V)) at the terminal VP is applied to the control terminal P3 of the switching element 14 through the node 17 of the wire 160 and the wire 170, the switching element 14, the rectifier element 11 and the rectifier element 12 cannot be turned ON.

As described above, the ground-fault current does not flow from the terminal VCC toward the terminal VP when the terminal VP is shorted to ground. Therefore, breakdown of the rectifier element 11 and the rectifier element 12 can be prevented. This protective function against shorting to ground is performed for a case where the terminal VP has been shorted to ground before the step-up operation (before the voltage VCC of the voltage source V1 is applied to the terminal VCC) and a case where the terminal VP is shorted to ground during the step-up operation (after the voltage VCC of the voltage source V1 is applied to the terminal VCC).

[Protective Operation Performed when Terminal BC2 is Shorted to Ground (Before Step-UP Operation)]

The protective operation performed when the terminal BC2 in the step-up circuit 10 of Embodiment 1 is shorted to ground (before step-up operation) will now be described.

Before the step-up operation, the voltage at the terminal VCC, the voltage at the terminal VP, the voltage at the terminal BC1 and the voltage at the terminal BC2 are all initial voltage 0(V). If the terminal BC2 is shorted to ground, the voltage at the terminal BC2 continues to be the initial voltage 0(V). For this reason, the rectifier element 12 is applied with the voltage ((0V)) at the terminal BC2 to the high-potential electrode P6, and is reversely biased. Therefore, the rectifier element 12 cannot be turned ON. In this state, a current path of a ground-fault current flowing from the terminal VCC toward the terminal VP and a current path of a ground-fault current flowing from the terminal BC2 toward the terminal VP are disconnected, so that the voltage at the terminal VP cannot not rise from the initial voltage 0(V).

To allow the switching element 14 and the rectifier element 11 to be turned ON, it is necessary to apply a voltage with "Vthm+Vd(V)" or more to the control terminal P3 of the switching element 14. However, the voltage (0(V)) is applied to the control terminal P3 of the switching element 14 through the node 17 of the wire 160 and the wire 170, and therefore, the switching element 14 and the rectifier element 11 cannot be turned ON. For this reason, the current path of the ground-fault current flowing from the terminal VCC toward the terminal BC2 is disconnected.

As described above, when the terminal BC2 is shorted to ground before the step-up operation, the switching element 14, the rectifier element 11 and the rectifier element 12 cannot be turned ON. This can prevent breakdown of the rectifier element 11 and the rectifier element 12. If the initial voltage at the terminal VP is higher than 0(V) before the step-up operation, the operation similar to the protective operation performed when the terminal BC2 is shorted to ground during the step-up operation, which will be described next, is performed, and will not be described here.

[Protective Operation Performed when Terminal BC2 is Shorted to Ground (During Step-Up Operation)]

The protective operation performed when the terminal BC2 in the step-up circuit 10 of Embodiment 1 is shorted to ground (during step-up operation) will be described with reference to the timing chart of FIG. 3.

Figure 3:
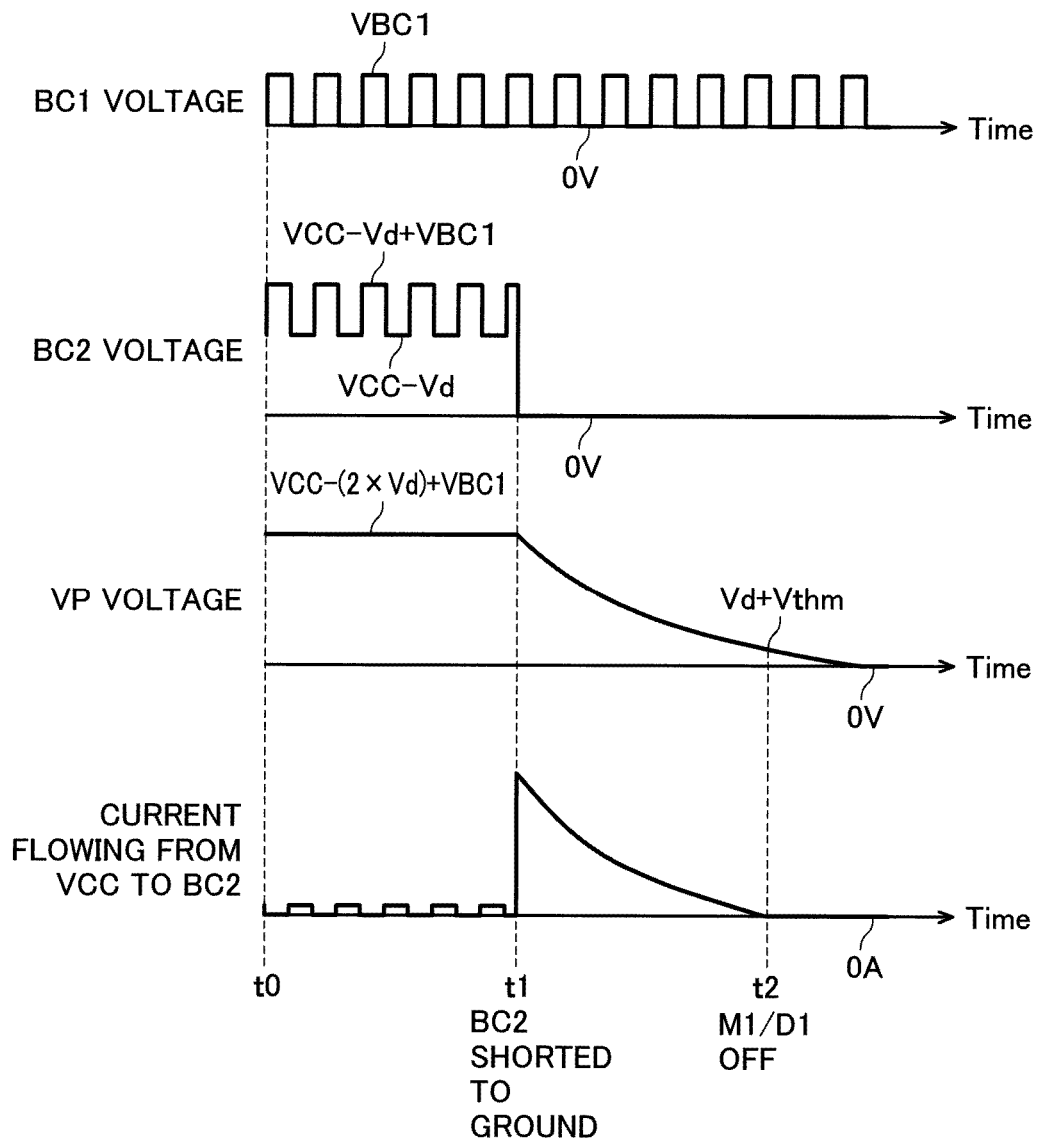
FIG. 3 is a timing chart showing the operation of the step-up circuit according to Embodiment 1 of the present invention, which occurs when a terminal BC2 is shorted to ground.

It is supposed that before time t0, the step-up operation is steady and the voltage at the terminal VP is stable at "VCC+VBC1−2×Vd(V)" as shown in FIG. 3. The oscillation circuit 13 continues to input the clock signal CLK to the terminal BC1, and therefore the voltage at the terminal BC1 has a waveform in which VBC1 (V) and 0(V) are repeated alternately such that one of them appears every ½ cycle the clock signal CLK. The voltage at the terminal BC2 has a waveform in which "VC−Vd(V)" and "VCC+VBC1−Vd(V)" are repeated, based on the clock signal CLK.

At time t1, the terminal BC2 is shorted to ground, and the voltage at the terminal BC2 drops to 0(V). In this case, to turn ON the switching element 14 and the rectifier element 11, it is necessary to flow a voltage with "Vthm+Vd(V)" or more to the control terminal P3 of the switching element 14. Just after the terminal BC2 is shorted to ground, stored charge is present in the capacitor C1, and therefore, the voltage at the terminal VP is stable at "VCC+VBC1−2×Vd(V)". For this reason, the switching element 14 and the rectifier element 11 cannot be turned OFF immediately. In this state, the current path of the ground-fault current flowing from the terminal VCC toward the terminal BC2 is not disconnected, causing the ground-fault current to flow through the rectifier element 11.

However, the terminal VP is connected to the load control circuit 50 via the wire 160, the wire 180 and the terminal VG Therefore, the charge stored in the capacitor C1 is discharged by consumption of a current in the load control circuit 50 and therefore, the voltage at the terminal VP decreases with a lapse of time.

At time t2, the voltage at the terminal VP decreases to "Vthm+Vd (V)" at which the switching element 14 and the rectifier element 11 are turned ON. At this time, the switching element 14 and the rectifier element 11 are switched from ON to OFF, and the current path of the ground-fault current flowing from the terminal VCC toward the terminal BC2 is disconnected. Such an operation implements a function of a timer circuit for suppressing continued generation of the ground-fault current, and can eliminate a need for an exclusive timer circuit disclosed in the Publication No. 2007-300760.

Since the ground-fault current flows for a moment from time t1 to time t2, the switching element 14 and the rectifier element 11 are temporarily burdened. However, by controlling the current capability of the switching element 13, the current consumed in the load control circuit 50 and the capacitance of the capacitor C1, breakdown of the rectifier element 11 can be prevented.

Figure 10:
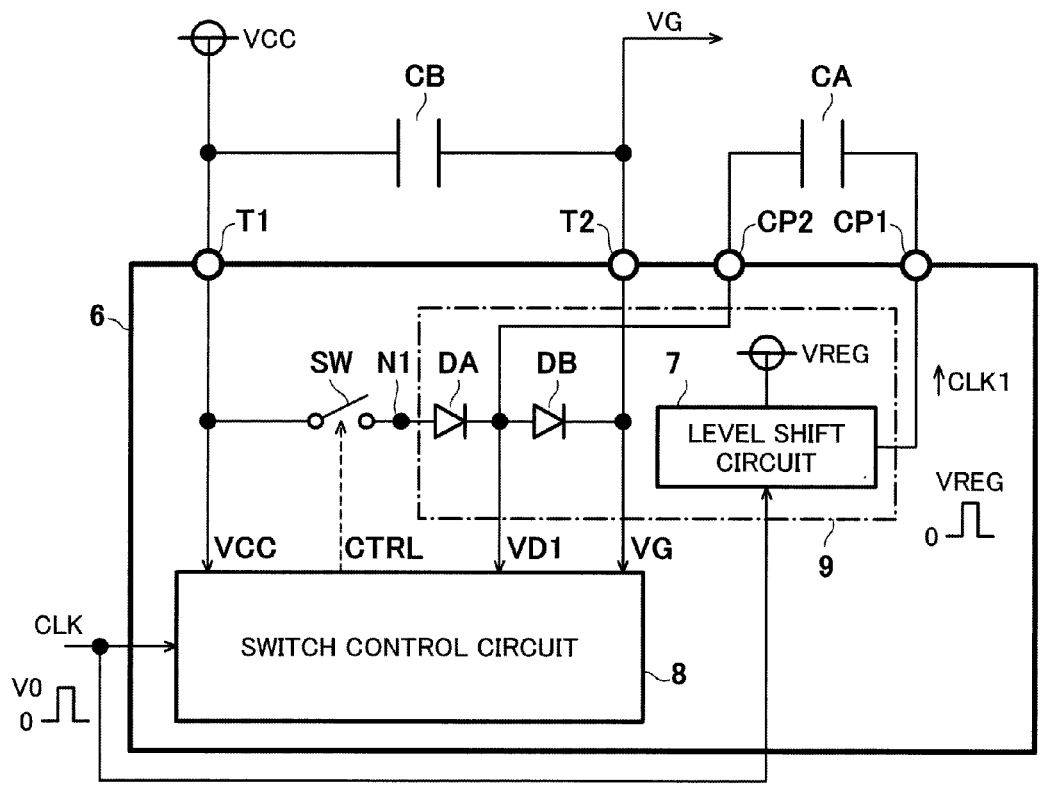
FIG. 10 is a view showing a configuration of a step-up circuit device including a conventional step-up circuit.

As described above, in accordance with the step-up circuit device 100 including the step-up circuit 10 of Embodiment 1, the switching control circuit 8 for protection against shorting to ground as shown in FIG. 10 may be omitted. As a result, the control of the step-up circuit 10 can be simplified, a scale of the step-up circuit 10 does not increase, the cost and size of the step-up circuit 100 can be reduced.

Embodiment 2

Figure 4:
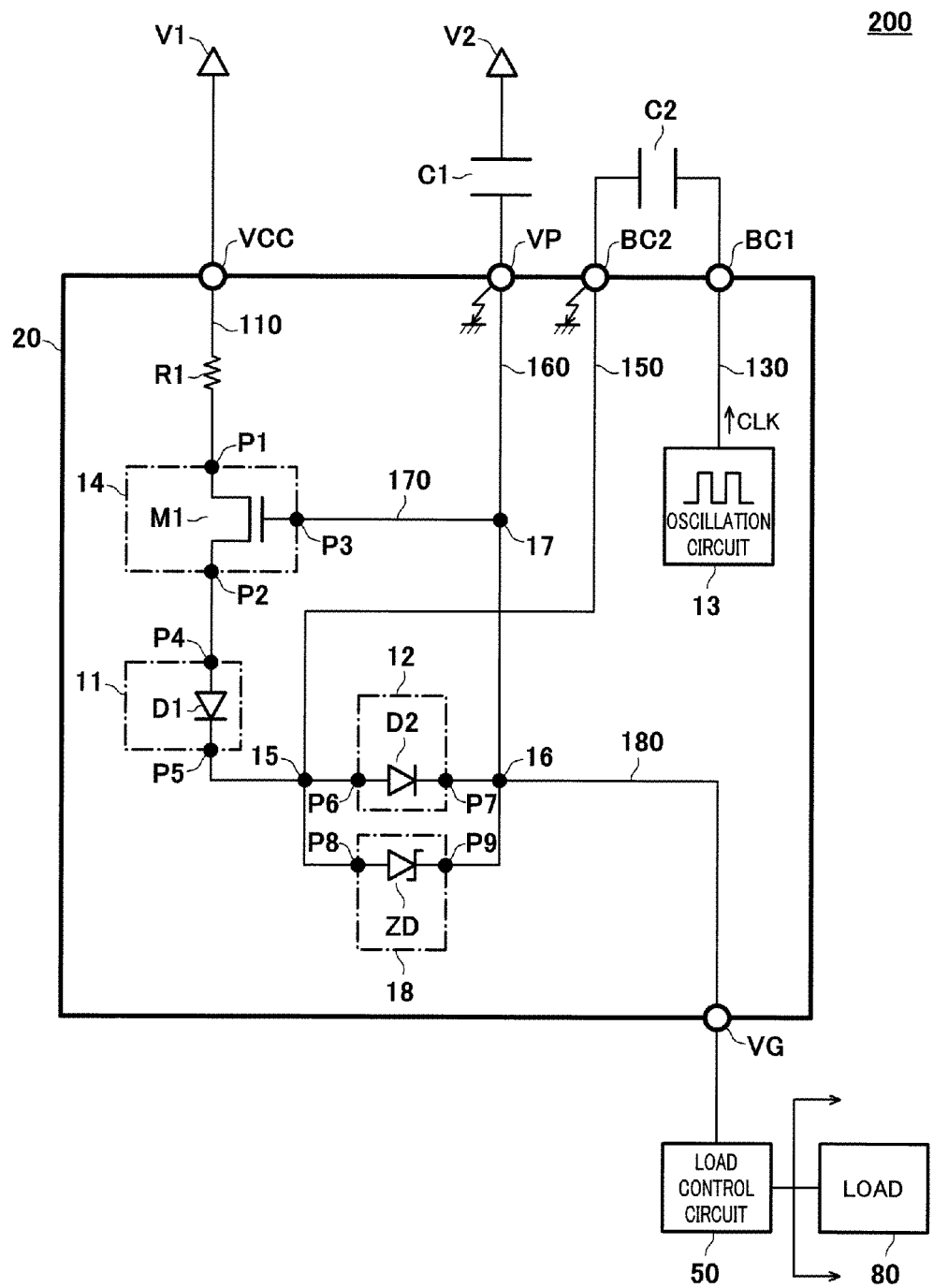
FIG. 4 is a view showing a configuration of a step-up circuit device including a step-up circuit according to Embodiment 2 of the present invention.

FIG. 4 is a view showing a configuration of a step-up circuit device including a step-up circuit according to Embodiment 2 of the present invention. In Embodiment 2 of the present invention, the ground-fault current temporarily generated in the step-up circuit 10 of Embodiment 1 of the present invention is effectively suppressed when the terminal BC2 is shorted to ground during the step-up operation.

Referring to FIG. 4, a step-up circuit 20 includes a resistor element R1 and a voltage clamping circuit 18, in addition to the constituents of the step-up circuit 10 of FIG. 1. The other constituents are identical to those of the step-up circuit 10 and will not be described repetitively.

The resistor element R1 is a resistive element for restricting a maximum current of the ground-fault current. The resistor element R1 is provided on a current path (wire 110, 150) between the terminal VCC and the terminal BC2. Although the resistive element R1 is provided between the terminal VCC and the main terminal P1 of the switching element 14, it may be provided between the main terminal P2 of the switching element 14 and the high-potential electrode P4 of the rectifier element 11, between the low-potential electrode P5 of the rectifier element 11 and the node 15, etc.

The voltage clamping circuit 18 is provided on a current path from the terminal BC2 to the terminal VP such that the voltage clamping circuit 18 is connected in parallel with the rectifier element 12. The voltage clamping circuit 18 clamps the voltage at the terminal VP to a predetermined threshold voltage VZ when the voltage at the terminal VP is higher than the voltage at the voltage at the terminal BC2 by the predetermined threshold voltage VZ or more.

The voltage clamping circuit 18 is constituted by a zener diode ZD which uses the predetermined threshold voltage VZ as a zener potential. In this case, the high-potential electrode P8 of the zener diode ZD is connected to the high-potential electrode P6 of the rectifier element 12, while the low-potential electrode P9 of the zener diode ZD is connected to the low-potential electrode P7 of the rectifier element 12. Alternatively, the voltage clamping circuit 18 may be configured to include a plurality of zener diodes coupled in series.

The voltage clamping circuit 18 may be constituted by a diode using the predetermined threshold voltage VZ as a forward voltage. In this case, the high-potential electrode P8 of the diode is connected to the low-potential electrode P7 of the rectifier element 12, while the low-potential electrode P9 of the diode is coupled to the high-potential electrode P6 of the rectifier element 12.

Figure 5:
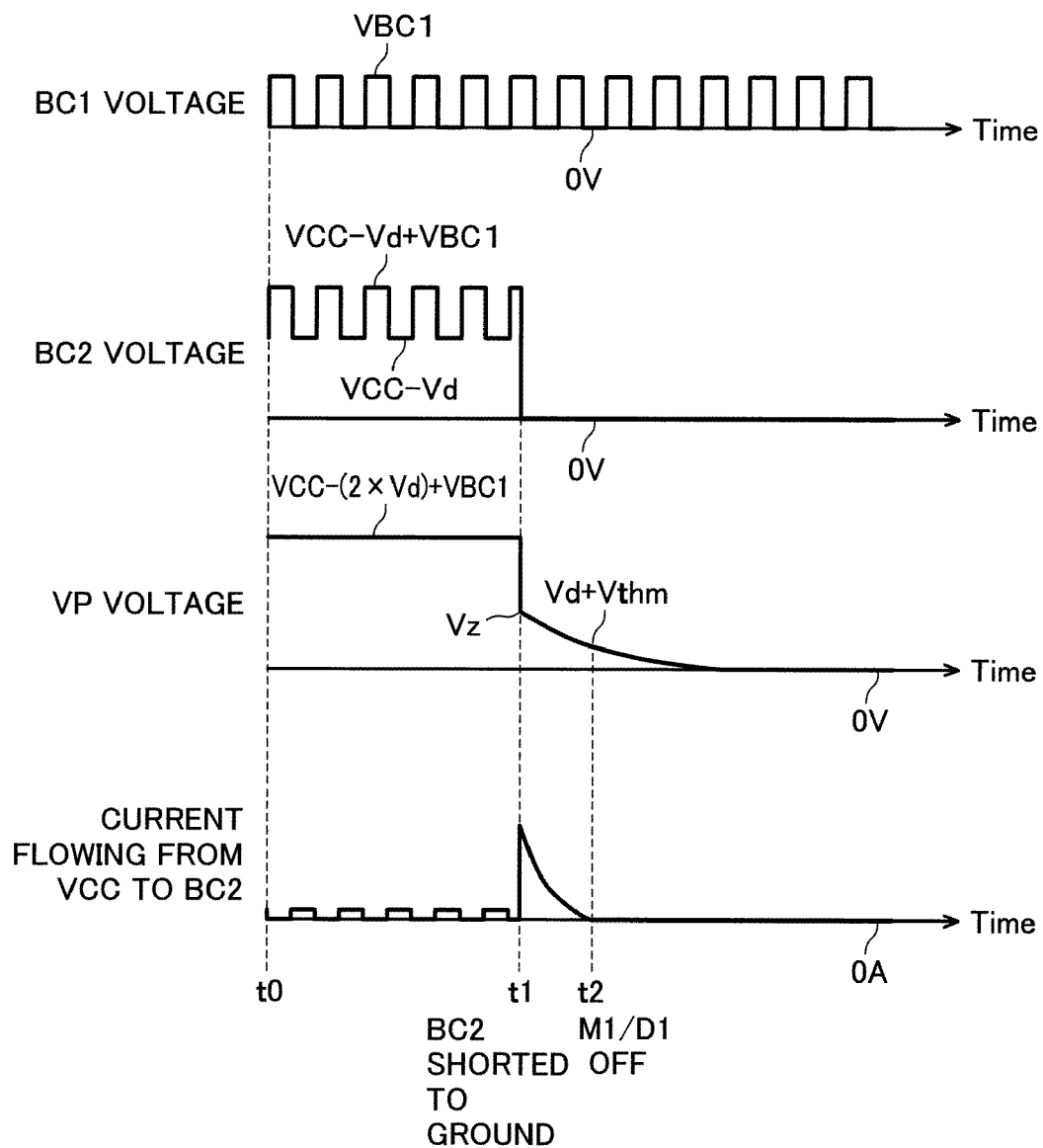
FIG. 5 is a timing chart showing the operation of the step-up circuit according to Embodiment 2 of the present invention, which occurs when the terminal BC2 is shorted to ground.

The protective operation performed when the terminal BC2 in the step-up circuit 20 of Embodiment 2 is shorted to ground (during the step-up operation) will be described with reference to the timing chart of FIG. 5.

The operation from time t0 to time t1 is identical to the operation shown in the timing chart of FIG. 3 and will not be described repetitively.

At time t1, the terminal BC2 is shorted to ground and the voltage at the terminal BC2 drops to 0(V). Just after the terminal BC2 is shorted to ground, stored charge is present in the capacitor C1, and therefore the voltage at the terminal VP is stable at "VCC+VBC1−2×Vd(V)". In this state, the switching element 14 and the rectifier element 11 cannot be turned OFF immediately.

Since the voltage at the terminal VP is higher than the voltage at the terminal BC 2 by the predetermined threshold voltage VZ of the voltage clamping circuit 18 or more, the voltage clamping circuit 18 operates. According to the operation of the voltage clamping circuit 18, the voltage at the terminal VP decreases from "VCC+VBC1−2×Vd(V)" to the predetermined threshold voltage VZ and clamped to the threshold voltage VZ. At this time, a ground-fault current flows through the current path from the terminal VCC to the terminal BC2, but a maximum current of the ground-fault current can be restricted by the resistor element R1.

After time t1, the charge stored in the capacitor C1 is discharged by consumption of the current in the load control circuit 50, and therefore, the voltage at the terminal VP decreases from the predetermined threshold voltage VZ with a lapse of time.

At time t2, the voltage at the terminal VP decreases from the predetermined threshold voltage VZ to "Vthm+Vd(V)", and therefore, the switching element 14 and the rectifier element 11 are turned OFF. As a result, the current path of the ground-fault current flowing from the terminal VCC toward the terminal BC2 is disconnected.

As described above, when the terminal BC2 is shorted to ground, the voltage at the terminal VP can be decreased to the predetermined threshold voltage VZ by the operation of the voltage clamping circuit 18. As a result, a duration of generation of the ground-fault current can be reduced. In addition, the resistor element R1 can restrict the maximum current of the ground-fault current. It should be noted that either one of the voltage clamping circuit 18 and the resistor element R1 may be provided as necessary.

When the voltage clamping circuit 18 is constituted by the zener diode ZD, it is possible to flow a current bidirectionally in the current path between the terminal VP and the terminal BC2. Therefore, the voltage clamping circuit 18 is capable of clamping the voltage and rectifying the current even when the rectifier element 12 is omitted. It should be noted that a step-up level of the voltage at the terminal VP possibly changes, but can be regulated by setting the amplitude of the clock signal CLK.

As described above, in accordance with the step-up circuit device 200 including the step-up circuit 20 of Embodiment 2, an increase in a scale of the step-up circuit 20 can be lessened, the ground-fault current flowing when the terminal BC2 is shorted to ground can be restricted, and a step-up characteristic can be maintained without a protective function against shorting to ground, which are implemented in a well-balanced manner.

Embodiment 3

Figure 6:
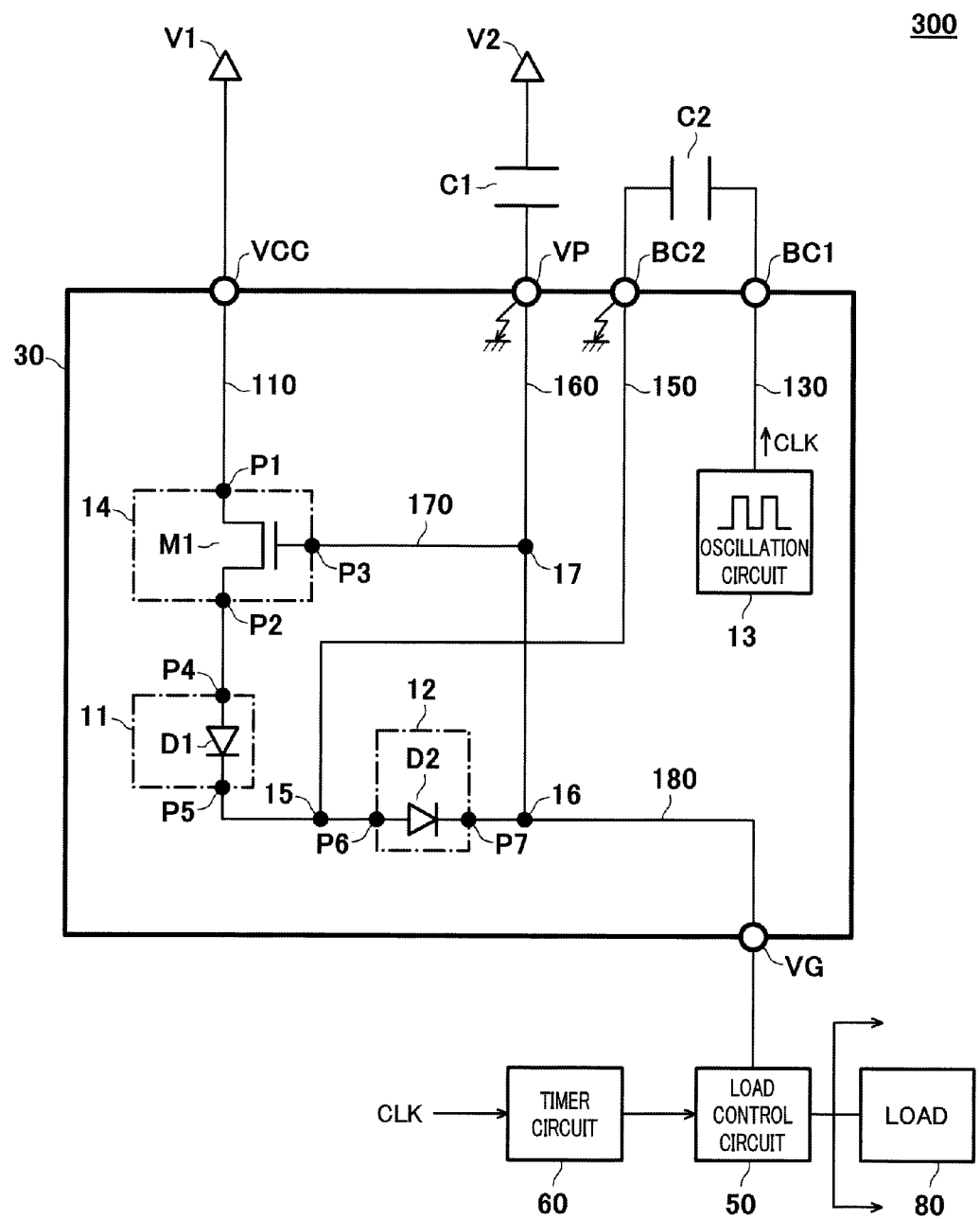
FIG. 6 is a view showing a configuration of a step-up circuit device including a step-up circuit according to Embodiment 3 of the present invention.

FIG. 6 is a view showing a configuration of a step-up circuit device including a step-up circuit according to Embodiment 3 of the present invention. In Embodiment 3 of the present invention, when the voltage output through the terminal VP is rising and still significantly low, the load control circuit 50 is placed in a stand-by mode for a predetermined time counted by a timer circuit 60. Therefore, an incorrect operation of the load control circuit 50 and an increase in heat generated in the load control circuit 50 can be prevented when the step-up operation starts, in addition to the advantage of Embodiment 1 of the present invention.

Referring to FIG. 6, a step-up circuit 30 includes the timer circuit 60 in addition to the constituents in the step-up circuit 10 of FIG. 1. The constituents other than the load control circuit 50 are identical to those of the step-up circuit 10 and will not be described repetitively.

The timer circuit 60 receives the clock signal CLK as an input from the oscillation circuit 13 and places the load control circuit 50 in a stand-by mode during a time period from when the clock signal CLK starts oscillation until the timer circuit 60 finishes counting a predetermined time. The predetermined time is defined as a time from when the voltage at the terminal VP rises from an initial voltage by the step-up operation until the voltage at the terminal VP and the voltage at the terminal VG may be regarded as being established.

The load control circuit 50 is placed in the stand-by mode when the output signal of the timer circuit 60 is L level, while the load control circuit 50 leaves the stand-by mode and becomes operable when the output signal of the timer circuit 60 is H level. Alternatively, the load control circuit 50 may be placed in the stand-by mode when the output signal of the timer circuit 60 is H level, while the load control circuit 50 may leave the stand-by mode when the output signal of the timer circuit 60 is L level.

Figure 7:
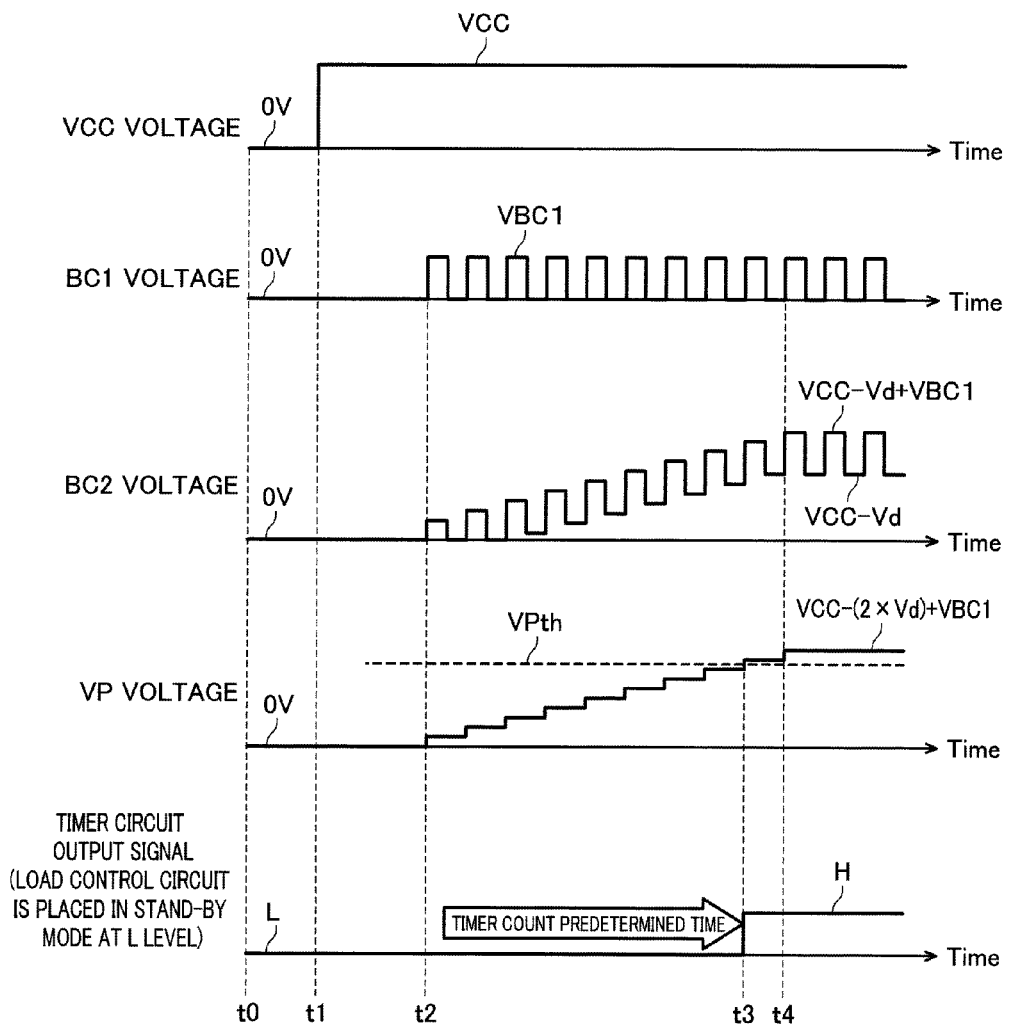
FIG. 7 is a timing chart showing a step-up operation of the step-up circuit according to Embodiment 3 of the present invention, at start of the step-up operation.

FIG. 7 is a timing chart showing the operation of the timer circuit 60.

The waveform of the voltage at the terminal VCC, the waveform of the voltage at the terminal BC1, the waveform of the voltage at the terminal BC2, and the waveform of the voltage at the terminal VP, are identical to those shown in FIG. 2 and therefore will not be described repetitively.

During a time period from time t0 to t2, the oscillation operation of the oscillation circuit 13 is stopped and the timer circuit 60 does not count the predetermined time. Therefore, the output signal output from the timer circuit 60 to the load control circuit 50 continues to be L level. In other words, the load control circuit 50 continues to be placed in the stand-by mode.

At time t2, the oscillation circuit 13 starts the oscillation operation and outputs the clock signal CLK to the terminal BC1. The timer circuit 60 receives the clock signal CLK from the oscillation circuit 13 as an input and counts the predetermined time according to a rising edge and a falling edge of the clock signal CLK. During a time period from time t2 to time t3, the timer circuit 60 is counting the predetermined time, and therefore the output signal output from the timer circuit 60 to the load control circuit 50 continues to be L level. In other words, the load control circuit 50 continues to be placed in the stand-by mode.

At timer t3, the timer 60 finishes counting the predetermined time and switches the output signal output to the load control circuit 50 from L level to H level. Thereupon, the load control circuit 50 leaves the stand-by mode and becomes operable.

Alternatively, the predetermined time counted by the timer circuit 60 of FIG. 7 may be set to a time period (time t2 to time t4) in which the voltage at the terminal VP and the voltage at the terminal VG rise from the initial voltages 0V to fully established values.

As described above, the timer circuit 60 enables the load control circuit 50 to operate more stably in a state where the voltage at the terminal VP and the voltage at the terminal VG are established.

Embodiment 4

Figure 8:
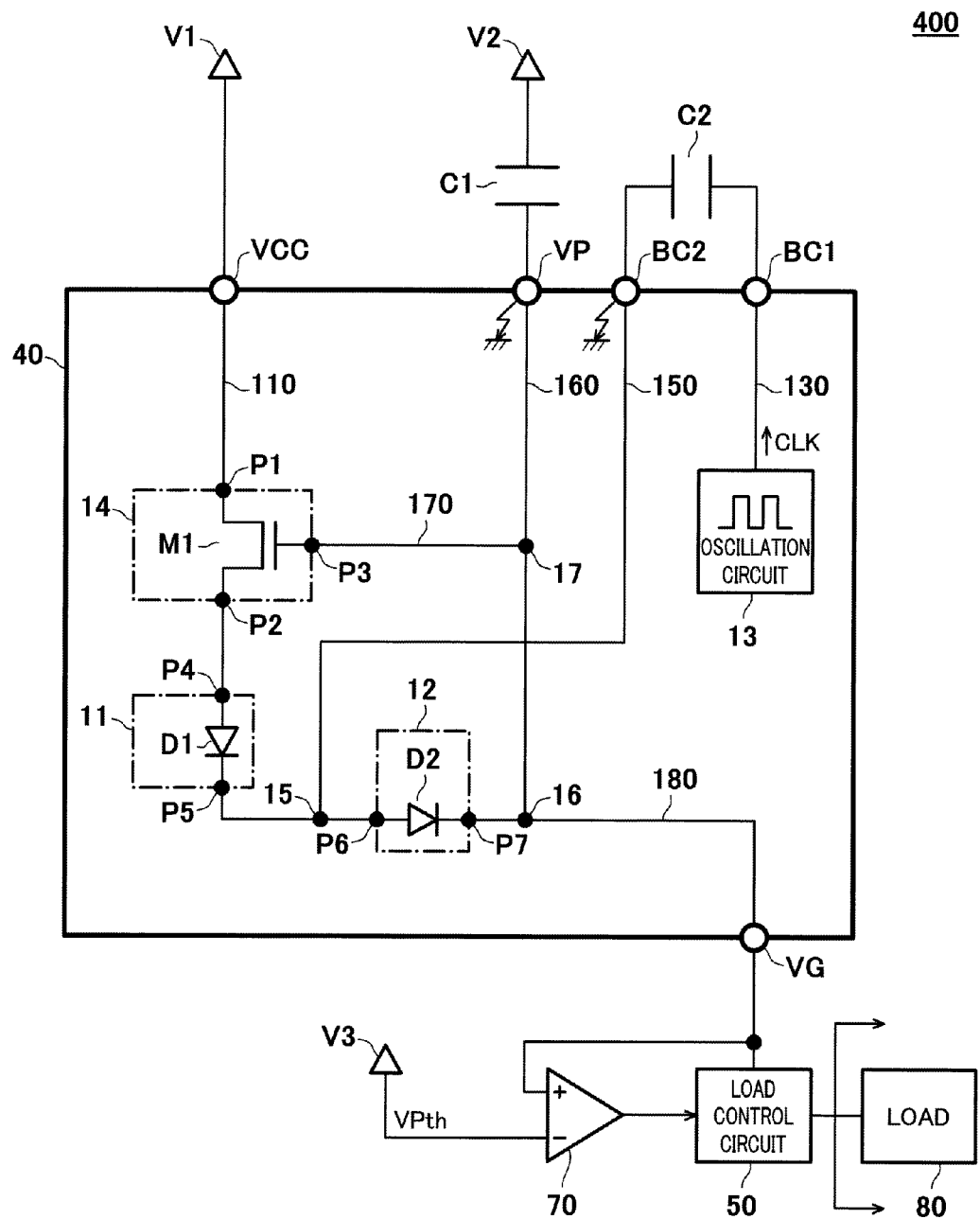
FIG. 8 is a view showing a configuration of a step-up circuit device including a step-up circuit according to Embodiment 4 of the present invention.

FIG. 8 is a view showing a configuration of a step-up circuit device including a step-up circuit according to Embodiment 4 of the present invention. In Embodiment 4 of the present invention, similarly to Embodiment 3 of the present invention, when the step-up voltage output through the first capacitor connecting terminal is rising and still significantly low, the load control circuit 50 is placed in a stand-by mode, during a period until the step-up voltage VG exceeds a predetermined reference voltage VPth in a comparator circuit 70. Therefore, an incorrect operation of the load control circuit 50 and an increase in heat generated heat in the load control circuit 50 can be prevented when the step-up operation starts, in addition to the advantage of Embodiment 1 of the present invention.

Referring to FIG. 8, a step-up circuit 40 includes the comparator circuit 70 in addition to the constituents in the step-up circuit 10 of FIG. 1. The constituents other than the load control circuit 50 are identical to those of the step-up circuit 10 and will not be described repetitively.

The comparator circuit 70 compares the voltage at the terminal VG (or voltage at the terminal VP) to a predetermined reference voltage VPth. The comparator circuit 70 places the load control circuit 50 in the stand-by mode during a period until the voltage at the terminal VG exceeds the predetermined reference voltage VPth. It is supposed that the predetermined reference voltage VPth is a voltage with which the voltage at the terminal VP and the voltage at the terminal VG may be regarded as being established.

In this embodiment, the comparator circuit 70 is constituted by an operational amplifier. A non-inverting input of the operational amplifier is connected to the terminal VG (or terminal VP), while an inverting input of the operational amplifier is connected to a voltage source V3 of the reference voltage VPth. When a relationship of "the voltage at the terminal VG (or voltage at the terminal VP)<reference voltage VPth" is satisfied, the output signal of the comparator circuit 70 is L level, while when a relationship of "the voltage at the terminal VG (or voltage at the terminal VP)>reference voltage VPth" is satisfied, the output signal of the comparator circuit 70 is H level.

The load control circuit 50 is placed in the stand-by mode when the output signal of the comparator circuit 70 is L level, while the load control circuit 50 leaves the stand-by mode and becomes operable when the output signal of the comparator circuit 70 is H level. Alternatively, the load control circuit 50 may be placed in the stand-by mode when the output signal of the comparator circuit 70 is H level, while the load control circuit 50 may leave the stand-by mode when the output signal of the comparator circuit 70 is L level.

Figure 9:
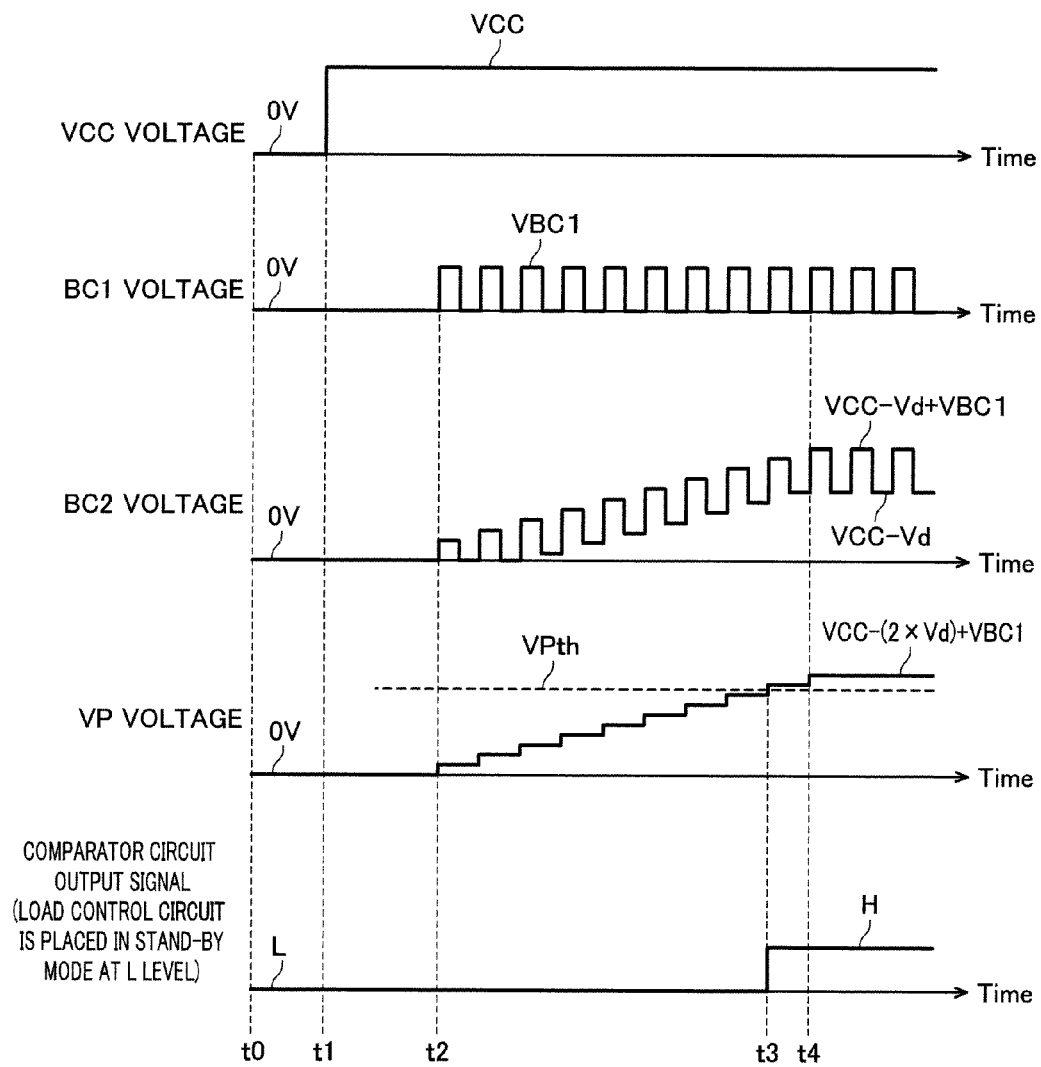
FIG. 9 is a timing chart showing a step-up operation of the step-up circuit according to Embodiment 4 of the present invention, at start of the step-up operation.

FIG. 9 is a timing chart showing the operation of the comparator circuit 70.

The waveform of the voltage at the terminal VCC, the waveform of the voltage at the terminal BC1, the waveform of the voltage at the terminal BC2, and the waveform of the voltage at the terminal VP, are identical to those shown in FIG. 2 and therefore will not be described repetitively.

During a time period from time t0 to time t2, the voltage at the terminal VP maintains the initial voltage 0(V). Therefore, a relationship of "voltage at terminal VG<reference voltage VPth" is satisfied and the output signal of the comparator circuit 70 continues to be L level. In other words, the load control circuit 50 continues to be placed in the stand-by mode.

During a time period from time t2 to time t3, the voltage at the terminal VP rises upon start of the step-up operation, but a relationship of "voltage at terminal VP<reference voltage VPth" is satisfied, and the output signal of the comparator circuit 70 continues to be L level. Therefore, the load control circuit 50 continues to be placed in the stand-by mode.

At time t3, a relationship of "voltage at terminal VP>reference voltage VPth" is satisfied, and the output signal of the comparator circuit 70 switches from L level to H level. At this time, the load control circuit 50 leaves the stand-by mode and becomes operable.

As described above, the comparator circuit 70 enables the load control circuit 50 to operate more stably in a state where the voltage at the terminal VP and the voltage at the terminal VG are established.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A step-up circuit configured to be connected to a first capacitor and a second capacitor, comprising:
a power supply terminal which is applied with a voltage source voltage;
a first capacitor connecting terminal which is configured to be connected to one electrode of the first capacitor and through which the step-up voltage generated by stepping up the voltage source voltage is output;
a first rectifier element which is provided on a current path from the power supply terminal to the first capacitor connecting terminal such that a direction from the power supply terminal toward the first capacitor connecting terminal is a forward direction;
a second rectifier element which is provided on a portion of the current path which is between the first rectifier element and the first capacitor connecting terminal such that a direction from the first rectifier element toward the first capacitor connecting terminal is a forward direction;
a second capacitor connecting terminal which is configured to be connected to one electrode of the second capacitor and is applied with an oscillating voltage;
a third capacitor connecting terminal which is connected to a portion of the current path which is between the first rectifier element and the second rectifier element and configured to be connected to the other electrode of the second capacitor; and
a switching element connected to a portion of the current path which is between a connection point, where the third capacitor connecting terminal is connected to the current path, and the power supply terminal, wherein a control terminal for controlling ON and OFF of the switching element is connected to the first capacitor connecting terminal, the switching element is turned ON when a voltage at the first capacitor connecting terminal is higher than a voltage at the third capacitor connecting terminal by a specified voltage or larger, and the switching element is turned OFF when the voltage at the first capacitor connecting terminal is not higher than the voltage at the third capacitor connecting terminal by the specified voltage or larger.

2. The step-up circuit according to claim 1,
wherein the switching element is a voltage-drive transistor including two main terminals to and from which a current inflows and outflows and the control terminal; and
one of the main terminals is connected to a portion of the current path which is located closer to the power supply terminal, and the other main terminal is connected to a portion of the current path which is located closer to the connection point of the third capacitor connecting terminal.

3. The step-up circuit according to claim 2,
wherein the switching element is a N-channel MOS field effect transistor;
the one main terminal is a drain terminal;
the other main terminal is a source terminal; and
the control terminal is a gate terminal.

4. The step-up circuit according to claim 3,
wherein the switching element is an enhancement type switching element.

5. The step-up circuit according to claim 2,
wherein the switching element is an insulated gate bipolar transistor;
the one main terminal is a collector terminal;
the other main terminal is an emitter terminal; and
the control terminal is a gate terminal.

6. The step-up circuit according to claim 1, further comprising:
a voltage clamping circuit connected in parallel with the second rectifier element;
wherein the voltage clamping circuit clamps the voltage at the first capacitor connecting terminal so that a voltage difference of the voltage at the first capacitor connecting terminal with respect to the voltage at the third capacitor connecting terminal does not exceed a predetermined voltage.

7. The step-up circuit according to claim 6,
wherein the second rectifier element is a diode;
the voltage clamping circuit is a zener diode;
an anode of the zener diode used as the voltage clamping circuit is connected to an anode of the diode used as the second rectifier element; and
a cathode of the zener diode used as the voltage clamping circuit is connected to a cathode of the diode used as the second rectifier element.

8. The step-up circuit according to claim 6,
wherein the second rectifier element is a diode;
the voltage clamping circuit is a diode;
an anode of the diode used as the voltage clamping circuit is connected to a cathode of the diode used as the second rectifier element; and
a cathode of the diode used as the voltage clamping circuit is connected to an anode of the diode used as the second rectifier element.

9. The step-up circuit according to claim 1, further comprising:
a resistor element provided on a current path between the power supply terminal and the third capacitor connecting terminal to restrict a current.

10. A step-up circuit configured to be connected to a first capacitor and a second capacitor, comprising:
a power supply terminal which is applied with a voltage source voltage;
a first capacitor connecting terminal which is configured to be connected to one electrode of the first capacitor and through which a step-up voltage generated by stepping up the voltage source voltage is output;
a diode which is provided on a current path from the power supply terminal to the first capacitor connecting terminal such that a direction from the power supply terminal toward the first capacitor connecting terminal is a forward direction;
a zener diode which is provided on a portion of the current path which is between the diode and the first capacitor connecting terminal such that a direction from the diode toward the first capacitor connecting terminal is a forward direction;
a second capacitor connecting terminal which is configured to be connected to one electrode of the second capacitor and is applied with an oscillating voltage;
a third capacitor connecting terminal which is connected to a portion of the current path which is between the diode and the zener diode and configured to be connected to the other electrode of the second capacitor; and
a switching element provided on a portion of the current path which is between a connection point, where the third capacitor connecting terminal is connected to the current path, and the power supply terminal, wherein
a control terminal for controlling ON and OFF of the switching element is connected to the first capacitor connecting terminal, the switching element is turned ON when a voltage at the first capacitor connecting terminal is higher than a voltage at the third capacitor connecting terminal by a specified voltage or larger, and the switching element is turned OFF when the voltage at the first capacitor connecting terminal is not higher than the voltage at the third capacitor connecting terminal by the specified voltage or larger; and
the zener diode clamps the voltage at the first capacitor connecting terminal to a predetermined voltage when the voltage at the first capacitor connecting terminal is higher than the voltage at the third capacitor connecting terminal by the predetermined voltage.

11. A step-up circuit device comprising:
a first capacitor;
a second capacitor;
a step-up circuit configured to output a step-up voltage generated by stepping up a voltage source voltage based on a clock signal;
a load control circuit configured to control a load based on the step-up voltage; and
a timer circuit configured to place the load control circuit in a stand-by mode during a time period from when the clock signal starts oscillation until the timer circuit finishes counting a predetermined time;
wherein the step-up circuit includes:
a power supply terminal which is applied with a voltage source voltage;
a first capacitor connecting terminal which is connected to one electrode of the first capacitor and through which the step-up voltage generated by stepping up the voltage source voltage is output;

a first rectifier element which is provided on a current path from the power supply terminal to the first capacitor connecting terminal such that a direction from the power supply terminal toward the first capacitor connecting terminal is a forward direction;

a second rectifier element which is provided on a portion of the current path which is between the first rectifier element and the first capacitor connecting terminal such that a direction from the first rectifier element toward the first capacitor connecting terminal is a forward direction;

a second capacitor connecting terminal which is connected to one electrode of the second capacitor and is applied with an oscillating voltage of the clock signal;

a third capacitor connecting terminal which is connected to a portion of the current path which is between the first rectifier element and the second rectifier element and to the other electrode of the second capacitor; and a switching element provided on a portion of the current path which is between a connection point, where the third capacitor connecting terminal is connected to the current path, and the power supply terminal, wherein a control terminal for controlling ON and OFF of the switching element is connected to the first capacitor connecting terminal, the switching element is turned ON when a voltage at the first capacitor connecting terminal is higher than a voltage at the third capacitor connecting terminal by a specified voltage or larger, and the switching element is turned OFF when the voltage at the first capacitor connecting terminal is not higher than the voltage at the third capacitor connecting terminal by the specified voltage or larger.

12. A step-up circuit device comprising:

a first capacitor;

a second capacitor;

a step-up circuit configured to output a step-up voltage generated by stepping up a voltage source voltage based on a clock signal;

a load control circuit configured to control a load based on the step-up voltage; and a timer circuit configured to place the load control circuit in a stand-by mode during a time period from when the clock signal starts oscillation until the timer circuit finishes counting a predetermined time;

wherein the step-up circuit includes:

a power supply terminal which is applied with a voltage source voltage;

a first capacitor connecting terminal which is connected to one electrode of the first capacitor and through which the step-up voltage generated by stepping up the voltage source voltage is output;

a diode which is provided on a current path from the power supply terminal to the first capacitor connecting terminal such that a direction from the power supply terminal toward the first capacitor connecting terminal is a forward direction;

a zener diode which is provided on a portion of the current path which is between the diode and the first capacitor connecting terminal such that a direction from the diode toward the first capacitor connecting terminal is a forward direction;

a second capacitor connecting terminal which is connected to one electrode of the second capacitor and is applied with an oscillating voltage of the clock signal;

a third capacitor connecting terminal which is connected to a portion of the current path which is between the diode and the zener diode and to the other electrode of the second capacitor; and a switching element provided on a portion of the current path which is between a connection point, where the third capacitor connecting terminal is connected to the current path, and the power supply terminal, wherein a control terminal for controlling ON and OFF of the switching element is connected to the first capacitor connecting terminal, the switching element is turned ON when a voltage at the first capacitor connecting terminal is higher than a voltage at the third capacitor connecting terminal by a specified voltage or larger, and the switching element is turned OFF when the voltage at the first capacitor connecting terminal is not higher than the voltage at the third capacitor connecting terminal by the specified voltage or larger; and the zener diode clamps the voltage at the first capacitor connecting terminal to a predetermined voltage when the voltage at the first capacitor connecting terminal is higher than the voltage at the third capacitor connecting terminal by the predetermined voltage.

13. A step-up circuit device comprising:

a first capacitor;

a second capacitor;

a step-up circuit configured to output a step-up voltage generated by stepping up a voltage source voltage based on an oscillating voltage;

a load control circuit configured to control a load based on the step-up voltage; and a comparator circuit configured to compare the step-up voltage to a predetermined reference voltage and place the load control circuit in a stand-by mode during a time period before the step-up voltage exceeds the predetermined reference voltage;

wherein the step-up circuit includes:

a power supply terminal which is applied with a voltage source voltage;

a first capacitor connecting terminal which is connected to one electrode of the first capacitor and through which the step-up voltage generated by stepping up the voltage source voltage is output;

a first rectifier element which is provided on a current path from the power supply terminal to the first capacitor connecting terminal such that a direction from the power supply terminal toward the first capacitor connecting terminal is a forward direction;

a second rectifier element which is provided on a portion of the current path which is between the first rectifier element and the first capacitor connecting terminal such that a direction from the first rectifier element toward the first capacitor connecting terminal is a forward direction;

a second capacitor connecting terminal which is connected to one electrode of the second capacitor and is applied with the oscillating voltage;

a third capacitor connecting terminal which is connected to a portion of the current path which is between the first rectifier element and the second rectifier element and to the other electrode of the second capacitor; and a switching element provided on a portion of the current path which is between a connection point, where the third capacitor connecting terminal is connected to the current path, and the power supply terminal, wherein a control terminal for controlling ON and OFF of the switching element is connected to the first capacitor connecting terminal, the switching element is turned ON when a voltage at the first capacitor connecting terminal is higher than a voltage at the third capacitor connecting terminal by a specified voltage or larger, and the switching element is turned OFF when the voltage at the first capacitor connecting terminal is not higher than the voltage at the third capacitor connecting terminal by the specified voltage or larger.

14. A step-up circuit device comprising:
a first capacitor;
a second capacitor;
a step-up circuit configured to output a step-up voltage generated by stepping up a voltage source voltage based on an oscillating voltage;
a load control circuit configured to control a load based on the step-up voltage; and
a comparator circuit configured to compare the step-up voltage to a predetermined reference voltage and place the load control circuit in a stand-by mode during a time period before the step-up voltage exceeds the predetermined reference voltage;
wherein the step-up circuit includes:
  a power supply terminal which is applied with a voltage source voltage;
  a first capacitor connecting terminal which is connected to one electrode of the first capacitor and through which the step-up voltage generated by stepping up the voltage source voltage is output;
  a diode which is provided on a current path from the power supply terminal to the first capacitor connecting terminal such that a direction from the power supply terminal toward the first capacitor connecting terminal is a forward direction;
  a zener diode which is provided on a portion of the current path which is between the diode and the first capacitor connecting terminal such that a direction from the diode toward the first capacitor connecting terminal is a forward direction;
  a second capacitor connecting terminal which is connected to one electrode of the second capacitor and is applied with the oscillating voltage;
  a third capacitor connecting terminal which is connected to a portion of the current path which is between the diode and the zener diode and to the other electrode of the second capacitor; and
  a switching element provided on a portion of the current path which is between a connection point, where the third capacitor connecting terminal is connected to the current path, and the power supply terminal, wherein
  a control terminal for controlling ON and OFF of the switching element is connected to the first capacitor connecting terminal, the switching element is turned ON when a voltage at the first capacitor connecting terminal is higher than a voltage at the third capacitor connecting terminal by a specified voltage or larger, and the switching element is turned OFF when the voltage at the first capacitor connecting terminal is not higher than the voltage at the third capacitor connecting terminal by the specified voltage or larger; and
the zener diode clamps the voltage at the first capacitor connecting terminal to a predetermined voltage when the voltage at the first capacitor connecting terminal is higher than the voltage at the third capacitor connecting terminal by the predetermined voltage.

* * * * *